United States Patent [19]
Meador et al.

[11] Patent Number: 5,402,068
[45] Date of Patent: * Mar. 28, 1995

[54] METHOD AND APPARATUS FOR LOGGING-WHILE-DRILLING WITH IMPROVED PERFORMANCE THROUGH CANCELLATION OF SYSTEMIC ERRORS THROUGH COMBINATION OF SIGNALS, UTILIZATION OF DEDICATED TRANSMITTER DRIVERS, AND UTILIZATION OF SELECTED REFERENCE SIGNALS

[75] Inventors: Richard A. Meador, Spring, Tex.; James E. Meisner, Citrus Heights; Ronald A. Hall, Sacramento, both of Calif.; Larry W. Thompson, Spring, Tex.; Edward S. Mumby, Carmichael, Calif.

[73] Assignee: Baker Hughes Incorporated, Houston, Tex.

[*] Notice: The portion of the term of this patent subsequent to Jan. 14, 2009 has been disclaimed.

[21] Appl. No.: 820,091

[22] Filed: Jan. 13, 1992

Related U.S. Application Data

[63] Continuation of Ser. No. 697,524, Apr. 29, 1991, Pat. No. 5,081,419, which is a continuation of Ser. No. 595,795, Oct. 9, 1990, abandoned, which is a continuation of Ser. No. 173,239, Mar. 24, 1988, abandoned.

[51] Int. Cl.⁶ .............................. G01V 3/30
[52] U.S. Cl. .................... 324/338; 343/720; 343/744
[58] Field of Search .................. 324/332–339, 324/341, 344, 356, 369; 343/719, 720, 741–744, 788, 867

[56] References Cited

U.S. PATENT DOCUMENTS

| | | |
|---|---|---|
| 3,305,771 | 2/1967 | Arps . |
| 3,551,797 | 12/1970 | Gouilloud et al. . |
| 3,849,721 | 11/1974 | Calvert . |
| 4,107,597 | 8/1978 | Meador et al. . |
| 4,185,238 | 1/1980 | Huchital et al. . |
| 4,209,747 | 6/1980 | Huchital . |
| 4,278,941 | 7/1981 | Freedman . |
| 4,300,098 | 11/1981 | Huchital et al. . |
| 4,334,227 | 6/1982 | Marks . |
| 4,451,789 | 5/1984 | Meador . |
| 4,511,842 | 4/1985 | Moran et al. . |

(List continued on next page.)

FOREIGN PATENT DOCUMENTS

| | | |
|---|---|---|
| 5627509A | of 0000 | Japan . |
| 1484200 | of 0000 | United Kingdom . |
| 2146126A | of 0000 | United Kingdom . |
| 2165359A | of 0000 | United Kingdom . |
| 798671 | of 0000 | U.S.S.R. . |

OTHER PUBLICATIONS

G. S. Huchital, et al., "The Deep Propagation Tool (A New Electronic Logging Tool)", SPE Paper No. 10988, (Oct. 1981).

(List continued on next page.)

Primary Examiner—Gerard R. Strecker
Assistant Examiner—Warren S. Edmonds
Attorney, Agent, or Firm—Melvin A. Hunn

[57] ABSTRACT

A logging-while-drilling system is disclosed which includes a pair of receiving antenna disposed between upper and lower transmitting antenna. The upper and lower transmitting antenna are energized successively to generate an electromagnetic wave which propagates through the formation surrounding the borehole. The amplitude attenuation and phase shift of the electromagnetic wave between the receiving antenna is measured. Measurements from both the upper and lower transmitting antenna can be combined to eliminate by cancellation system error components. In order to further improve the performance of the logging-while-drilling system, separate and dedicated driver circuits are provided proximate each transmitter. In addition, reference signals which are utilized to coordinate and synchronize the operation of the various components of the logging-while-drilling system are provided at frequencies which are substantially different from the interrogation frequency of the electromagnetic interrogation signal.

21 Claims, 10 Drawing Sheets

U.S. PATENT DOCUMENTS

| | | |
|---|---|---|
| 4,511,843 | 4/1985 | Thoraval . |
| 4,536,714 | 8/1985 | Clark . |
| 4,538,109 | 8/1985 | Clark . |
| 4,553,097 | 11/1985 | Clark . |
| 4,570,123 | 2/1986 | Grosso . |
| 4,609,873 | 9/1986 | Cox et al. . |
| 4,622,518 | 11/1986 | Cox et al. . |
| 4,626,785 | 12/1986 | HagiWara . |
| 4,651,101 | 3/1987 | Barber et al. . |
| 4,692,706 | 9/1987 | Mazzagatti et al. . |
| 4,692,707 | 9/1987 | Locke et al. . |
| 4,703,278 | 10/1987 | Nussbaum et al. . |
| 4,730,161 | 3/1988 | Cox et al. . |
| 4,761,656 | 8/1988 | Cosman et al. . |
| 4,766,384 | 8/1988 | Kleinberg et al. . |
| 4,785,247 | 11/1988 | Meador et al. ............... 324/338 |
| 4,785,247 | 11/1988 | Meador et al. . |
| 4,837,517 | 6/1989 | Barber . |
| 4,876,511 | 10/1989 | Clark . |
| 4,899,112 | 2/1990 | Clark et al. ............... 324/338 |
| 4,968,940 | 11/1990 | Clark et al. ............... 324/338 |
| 5,081,419 | 1/1992 | Meador et al. ............... 324/338 |

OTHER PUBLICATIONS

David G. Frunz, "Downhole Recording System for MWD", SPE Paper No. 10054 (Oct. 1981).

D. F. Coope, "Gamma Ray Measurement While Drilling", The Log Analyst, vol. XXIV, No. 1, pp. 3–9, (Jan.–Feb., 1983).

P. Rodney, et al., "The Electromagnetic Wave Resistivity MWD Tool", SPE Paper No. 12167, (Oct. 1983).

D. Coope, et al., "The Theory of 2MHz Resistivity Tool and its Application to Measurement While Drilling", The Log Analyst, (May–Jun. 1984), pp. 35–46.

Y. Jan, et al., "Borehole Correction of MWD Gamma Ray and Resistivity Logs", SPWLA Twenty–Fifth Logging Symposium, (Jun. 1984).

D. Coope, et al., "Formation Evaluation Using Measurements Recorded While Drilling", SPWLA Twenty–Fifth Annual Logging Symposium, (Jun. 1984).

W. Hendricks, et al., "MWD: Formation Evaluation Case Histories in the Gulf of Mexico", SPE Paper No. 13187, (Sep. 1984).

W. Honeybourne, "Formation MWD Benefits Evaluation and Efficiency", Oil & Gas Journal, (Feb. 25, 1985).

W. Honeybourne, "Future Measurement While Drilling Technology Will Focus On Two Levels", Oil & Gas Journal, (Mar. 4, 1985).

E. Yearsley, "A Users' Guide to MWD Logging in the Gulf of Mexico", Oil Patch, (May 20, 1985), pp. 18–22.

P. Holbrook, "The Effect of Mud Filtrate Invasion of the EWR Log-A Case History", SPWLA Twenty–Sixth Annual Logging Symposium (Jun. 1985).

S. Gianzero, et al., "A New Resistivity Tool for Measurement While Drilling", SPWLA Twenty–Sixth Annual Logging Symposium, Jun. 1985.

L. Elliott, et al., "Recording Downhole Formation Data While Drilling", Journal of Petroleum Technology (Jul. 1985) pp. 1231–1238.

M. Greif, et al., "Petrophysical Evaluation of Thinly Bedded Reservoirs in High Angle Displacement Development Wells with the NL Recorded Lithology Logging System", Tenth Formation Evaluation Symposium Paper, Sep.–Oct. 1985.

D. Coope, et al., "Formation Evaluation Using EWR Logs", SPE Paper No. 14062, (Mar. 1986), pp. 415–425.

D. Coope, et al., "Evaluation of Thin Beds and Low Resistivity Pays Using EWR Logs", Tenth European Formation Evaluation Symposium, (Apr. 1986).

C. Besson, et al., "Environmental Effects of Deep Electromagnetic Logging Tools", SPWLA 27th Annual Logging Symposium, (Jun. 1986).

W. Chin, et al., "Formation Evaluation Using Repeated MWD Logging Measurements", SPWLA 27th Annual Logging Symposium Paper (Jun. 1986).

M. Blenkinship, et al., "Deep Electromagnetic Propagation Tool Interpretation", SPWA 27th Annual Logging Symposium, (Jun. 1986).

S. Gianzero, et al., "Determining the Invasion Near the Bit with the MWD Toroid Sonde", SPWLA 27th Annual Logging Symposium, (Jun. 1986).

P. Rodney, et al., "Electromagnetic Wave Resistivity MWD Tool", SPE Drilling Engineering (Oct. 1986), pp. 337–346.

M. Grief, et al., "Petrophysical Evaluation of Thinly Bedded Reservoirs in High Angle/Displacement Development Wells with the NL Recorded Lithology Logging System", The Log Analyst, (Sep.–Oct. 1986), pp. 29–38.

"Log Interpretation Principles/Applications", Electromagnetic Propagation Logs, (1986), pp. 132–133, 137.

"The EWR Resistivity Sensor", Sperry Sun Baroid Logging System (Oct. 24, 1987).

C. Koopersmith, et al., "Environmental Parameters Affecting Neutron Porosity, Gamma Ray, and Resistivity Measurements Made While Drilling", SPE Paper No. 16758, (Sep. 1987).

M. Wisler, "Real Time Electromagnetic Propagation Resistivity and Memory for MWd", 11th European Formation Evaluation Symposium (Sep. 1988).

P. Rodney, et al., "Design of a Propagation Wave Resistivity Sensor In Order to Minimize the Influence of Borehole Fluids on the Sensor Response", SPE Paper No. 18114, (Oct. 1988).

N. L. Baroid Logging Systems, "Measurements While Drilling Technical Specifications".

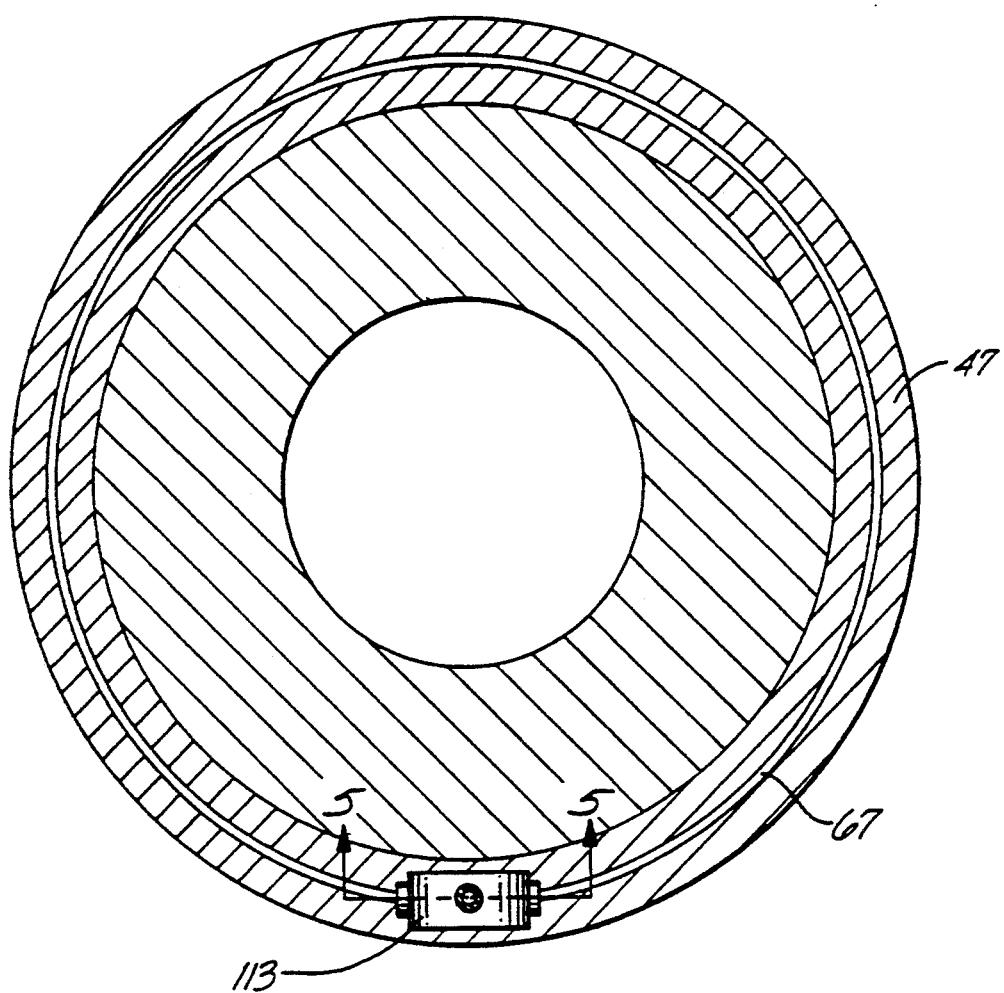
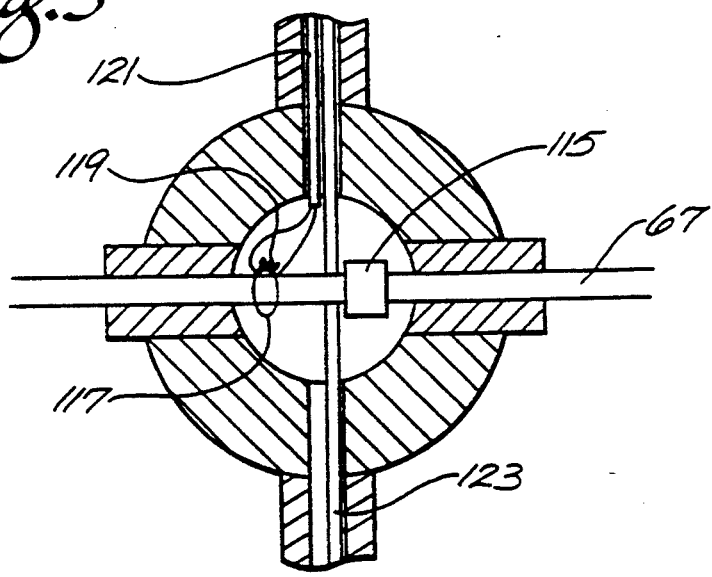

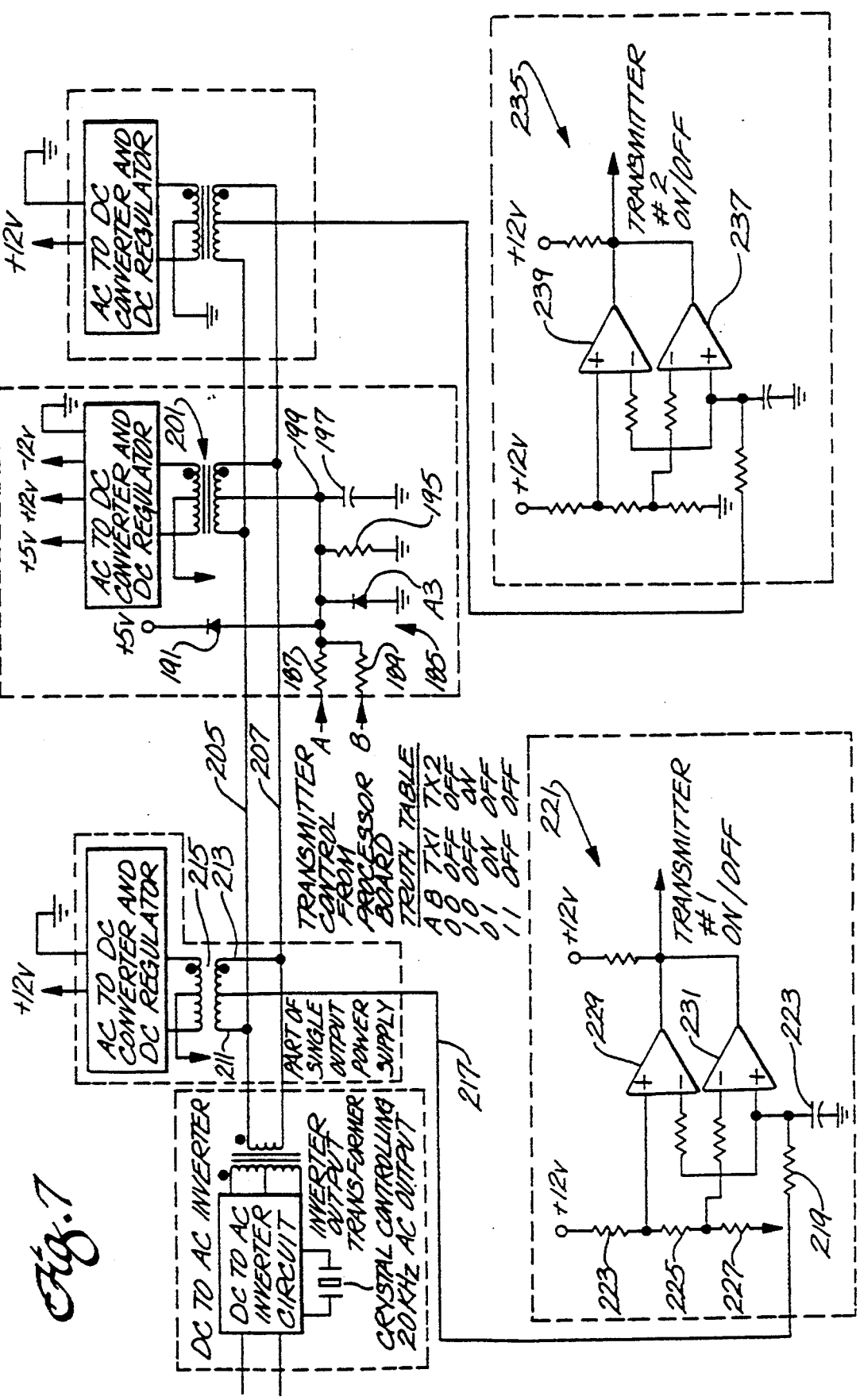

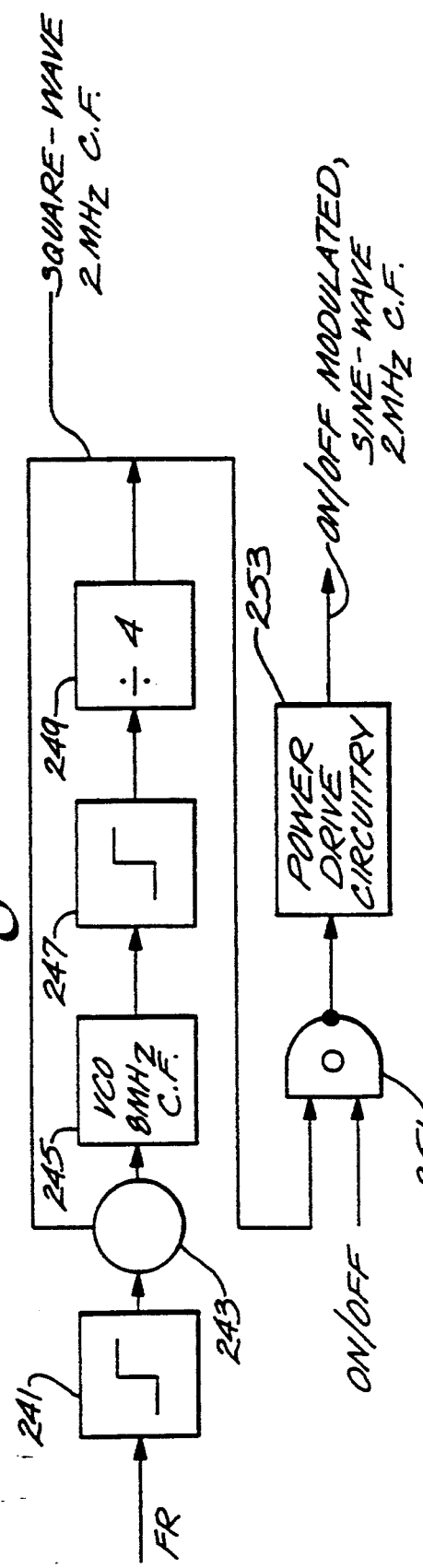
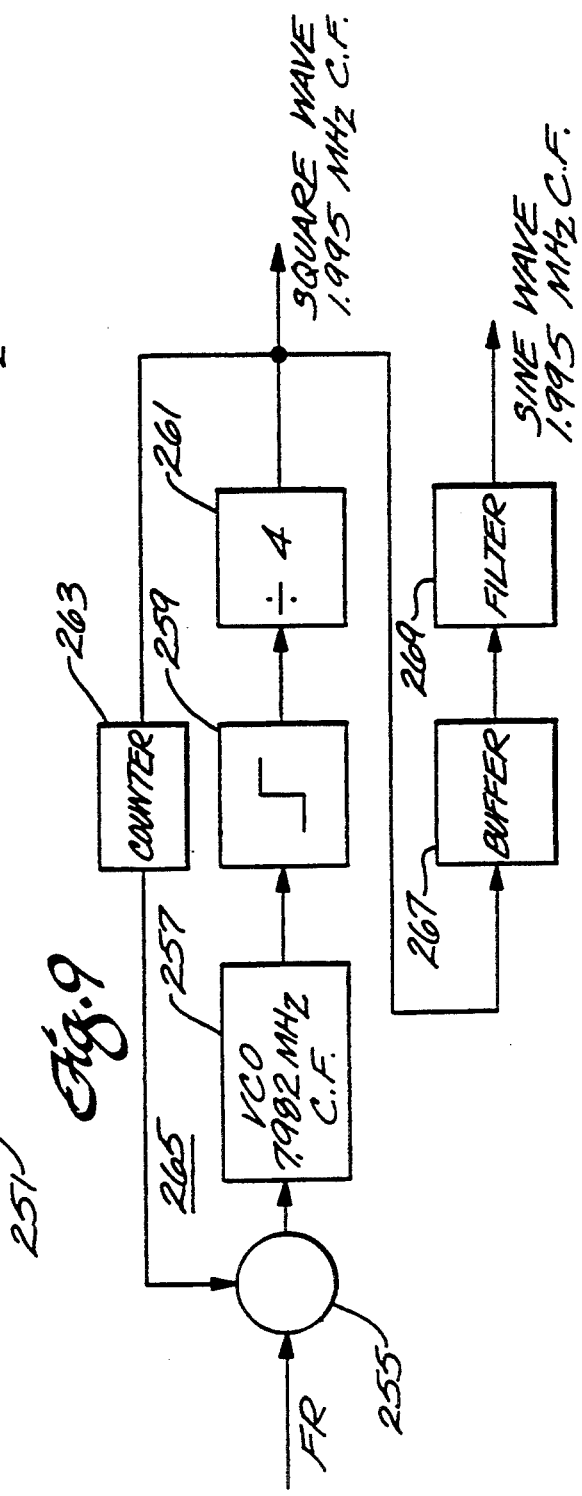

METHOD AND APPARATUS FOR LOGGING-WHILE-DRILLING WITH IMPROVED PERFORMANCE THROUGH CANCELLATION OF SYSTEMIC ERRORS THROUGH COMBINATION OF SIGNALS, UTILIZATION OF DEDICATED TRANSMITTER DRIVERS, AND UTILIZATION OF SELECTED REFERENCE SIGNALS

This application is a continuation of application Ser. No. 07/697,524, filed Apr. 29, 1991, now U.S. Pat. No. 5,081,419, which is a continuation of Ser. No. 07/595,795, filed Oct. 9, 1990, now abandoned, which is a continuation of Ser. No. 07/173,239, filed Mar. 24, 1988, now abandoned.

BACKGROUND OF THE INVENTION

1. Field of The Invention

In general, this invention relates to electrical logging of formations surrounding a borehole; more particularly, it relates to measuring formation resistivity by processing signals induced in receiving antennas by electromagnetic waves that are caused to propagate through the formation.

2. The Prior Art

Data concerning how an electrical parameter such as formation resistivity varies with well depth provide useful clues in exploring for oil and gas bearing beds. Resistivity may be expressed as the ratio of voltage gradient (e.g., voltage difference per meter), to current density (e.g., amperes per square meter), and is generally expressed in units of ohm-meters.

Over the years, many formation-resistivity measuring systems have been developed. The known systems may be classified in numerous ways. According to one basis for classification, a system can be categorized as either a wireline system or as a measure while drilling (MWD) system. Such systems can also be categorized with respect to frequency of operation of electrical signals used in effecting measurement of formation parameters.

Measuring while drilling has significant, long-recognized advantages. For the measurement of formation resistivity, a MWD system is particularly advantageous in reducing or eliminating the adverse effect that can be caused if drilling fluid (referred to as "mud") has had sufficient time to invade the formation before the resistivity measurement is made. A MWD system is advantageously incorporated in a logging collar section or sub that is positioned in the drill string very close to the drill bit. Thus, relatively little time elapses from when the drill bit cuts through a region and when the sub is brought into position to effect a measurement of a parameter of the formation in that region. Another advantage of a MWD system is that data for any formation parameter it measures that can be communicated to the surface during drilling operations via mud pulse telemetry techniques.

Such advantages, however, can be gained only if the MWD system is capable of withstanding the extremely adverse environmental conditions prevailing down hole while drilling. The adverse environmental conditions involve high temperature and shock. Further, during the drilling operation, mud is circulated under high pressure to flow down through a passageway within the drill string to, and out of the drill bit, and then to flow back up in the annular space between the drill string and the wall of the borehole, carrying cuttings to the surface. Various elements of a MWD system must be contained in an electronics housing, which is a sealed pressure vessel or barrel, that is anchored in place within the MWD sub and that protects components such as electronic circuits from exposure to the high pressure mud. Further, any element of the MWD system that is exposed to the upwardly flowing mud, and the whipping action of the drill string against the inner wall of the borehole, must be extremely abrasion resistant.

Another difficulty associated with a MWD system is that the electrical power for the MWD system is generated within a downhole drilling segment by a turbine-driven generator, the turbine being driven by the down-flowing mud. Because the electrical power is generated inside the drill string segment while high pressure drilling mud is circulating down inside the drill string segment and up about its outside, complexities arise in distributing electrical power and electrical signals to various components of the MWD system.

In contrast to a MWD system, far fewer problems need to be addressed in a well logging system, commonly called a wireline system, that is used while drilling operations are suspended. Because the mud is stationary while drilling operations are suspended, various elements of a wireline system are not subjected to the adverse conditions discussed above. One minor exception is that downhole temperature is somewhat higher while the mud is stationary than while the mud is circulating and to some extent providing cooling. The environmental conditions of use of a wireline system, in addition to being generally more benign, enable substantially more control over distribution of electrical power. In a wireline system, a generator is located at the surface, and the electric power it generates is easily supplied to downhole electronics.

As stated above, another way of classifying a system is on the basis of the frequency of operation of an electrical signal used to effect the measurement. With respect to the lowest end of the frequency spectrum, there are electrode systems that involve a frequency of operation in the neighborhood of about 1 KHz. Each of these low frequently systems relies upon conduction of current through the mud as part of a current flow path that also includes electrodes and the surrounding formation. Because the mud forms part of this current flow path, an electrically conductive mud such as a water base mud is necessary for proper operation of any of these systems. In many drilling operations, it is undesirable to use such a water base mud, and instead it is desirable to use an oil base mud that has very high resistivity.

Examples of wireline electrode systems are described in two papers authored by Hubert Guyod. One of these, titled "The Shielded Electrode Method," appears in the December 1951 issue of *World Oil*, at pages 111–116. The other, titled "Factors Affecting the Responses of Laterolog-Type Logging Systems (LL3 and LL7)," appears in the February 1964 issue of the *Journal of Petroleum Technology*, at pages 211–219. Examples of MWD electrode systems are described in U.S. Pat. No. 4,570,123 to Grosso. An improved MWD electrode system has been developed by the assignee of this invention and is disclosed and claimed in a U.S. patent application Ser. No. 025,937, filed Mar. 16, 1987, entitled "WELL LOGGING SYSTEM EMPLOYING FOCUSED CURRENT IN MEASURING RESISTIVITY WHILE DRILLING"; the inventors being J. Meisner, et al.

With respect to the next frequency range in the spectrum, there are induction systems that involve a frequency of operation in the neighborhood of 20 KHz. An induction logging system generates a magnetic field in the formation to produce a secondary current flow in the formation. The secondary current flow sets up a second magnetic field which induces current in receiving coils in proportion to the secondary current flow in the formation and thus the induced current is directly proportional to the resistivity of the surrounding formation.

An induction logging system uses large diameter coils to obtain the necessary coupling. To apply induction logging techniques in a MWD system, inductive logging coils must be mounted in or about a drill collar in a drill string and that portion of the collar must be non-conductive. It is difficult to build a non-conductive collar that has the structural integrity and strength necessary for use in a drill string.

With respect to a much higher range of frequencies in the spectrum, there are electromagnetic wave propagation (EWP) systems that involve a frequency of operation in the range of about 500 KHz to about 4 MHz. An EWP system is disclosed in U.S. Pat. No. 3,551,797 to Gouilloud et al. The EWP system disclosed in the Gouilloud patent is a wireline system having a transmitter and receivers for measuring formation parameters, and utilizing phase comparison and amplitude. U.S. Pat. Nos. 4,107,597 and 4,185,238 also show EWP wireline systems.

Each of the foregoing wireline systems involves a non-conductive sonde. Because the sonde is non-conductive, it does not significantly reduce the signal strength of the electromagnetic wave signal used to effect the measurement of formation resistivity. Circumstances are different in the case of a MWD system in which electromagnetic wave propagation is used to accomplish the measurement of formation resistivity. A MWD system necessarily involves a metal drill collar, and because the metal drill collar is highly conductive it can significantly reduce the signal strength of the receiver signals derived from the electromagnetic wave signal used to effect the measurement. The problem of dealing with very low signal strengths can be aggravated by the presence of electrical noise.

A published U.K. Patent Application No. GB 2,146,126A is directed a specific electrostatic shielding arrangement for reducing the adverse effect of noise in a MWD system that uses electromagnetic wave propagation for measuring formation resistivity. A paper relating to this MWD system was presented at a SPE conference in San Francisco, Calif., Oct. 5-8, 1983; this paper is titled "The Electromagnetic Wave Resistivity MWD Tool"; its authors are P. F. Rodney et al. According to the published U. K. patent application, the preferred embodiment of the specific electrostatic shielding system is provided in a MWD EWP system that includes a drill collar that has an outside diameter of 17.8 cm, and has two axially-spaced apart cylindrical annular recesses each of which has a diameter of 14.6 cm. Each of the recesses is filled in with nitrile rubber. A transmitting antenna is embedded in the nitrile rubber that fills in one of the recesses, and two axially-spaced apart receiver antennas are embedded in the nitrile rubber that fills in the other recess. Each antenna has an inner diameter of 15.75 cm. Thus, there is a minimum spacing of about 0.55 cm. between an antenna and the drill collar. The axial spacing between the transmitting antenna and the nearer of the two receiving antennas is 24 inches, and the more remote antenna coil is an additional 6 inches further away. Each antenna is almost completely surrounded by a corresponding one of three electrostatic shields that are electrically isolated from the metal drill collar and electrically connected by conductors in coax cables extending to signal processing circuitry to ground (0 volts).

The performance capabilities of a well logging system can be judged in terms of various factors. One factor is ease of use; others are depth of investigation, dynamic range, resolution with respect to delineating narrow beds, and the extent to which measurements are independent of extraneous matters such as borehole effects.

As stated above, some well logging systems are not adapted for use in circumstances in which an oil base mud is being used. As to prior art EWP systems that are adapted for use in such circumstances, there are various problems. One of these problems is that the response of each antenna has to be extremely stable with respect to temperature variations. The known design principles applicable to such a prior art system are to effect a tradeoff of antenna sensitivity in favor of antenna stability. This in turn results in other sacrifices. In this regard, it is desirable to provide substantial axial spacings between the transmitting antenna and the receiving antennas. However, the relatively low sensitivity of the antennas used in prior art systems imposes a limit on how far apart the antennas can be spaced.

Such shortcomings are widely recognized, and there has been a longstanding need for an improved EWP system to overcome these shortcomings.

SUMMARY OF THE INVENTION

This invention provides an improved system and method for measuring a formation parameter.

Defined broadly in apparatus terms, the invention resides in apparatus for use in a borehole to measure an electrical parameter of the formation surrounding the borehole. The apparatus comprises housing means, and first and second transmitting antenna means, each arranged around the housing means and spaced from each other. The apparatus further comprises transmitting circuit means for alternately supplying an oscillating drive signal to the first and second transmitting antenna means. The oscillating electrical drive signal has a frequency sufficiently high such that one and then the other of the transmitting antenna means radiates an electromagnetic wave signal that propagates through the formation. The apparatus further comprises first and second receiving antenna means for producing first and second pick-up signals. Each receiving antenna means is arranged around the housing means at a spaced position between the first and second transmitting antenna means. Each receiving antenna means includes antenna circuit means in which an induced alternating current is produced while the electromagnetic wave signal propagates through the formation, tuning means for reducing impedance of the antenna circuit means in a frequency region embracing the frequency of the oscillating drive signal, and means responsive to the induced alternating current for producing a respective one of the pick-up signals. The apparatus further comprises sampled-data signal processing means responsive to the pick-up signals for producing a signal that is a function of the formation parameter.

Defined broadly in method terms, the invention resides in a method for measuring an electrical parameter of the formation surrounding a borehole. The method comprises the step of positioning in the borehole first and second receiving antenna that are each tuned to increase the sensitivity of the antenna at a predetermined frequency, and the step of generating an oscillating electrical drive signal at the predetermined frequency. The method further comprises the step of alternately coupling the electrical drive signal to one and then another of a pair of transmitters to cause an electromagnetic wave signal to propagate through the formation in first one direction and then another so that the propagating electromagnetic wave signal induces the first and second receiving antennae to develop a first pair and then a second pair of pick-up signals. The method further comprises processing steps including processing the first pair of pick-up signals to produce a first sampled signal, and recording the first sampled signal; processing the second pair of pick-up signals to produce a second sampled signal; and processing the recorded first sampled signal and the second sampled signal to produce a signal that is a function of the formation parameter.

A preferred embodiment of the invention resides in a measure-while-drilling system for measuring resistivity of a formation surrounding a borehole. In the preferred embodiment, the housing means is defined by a tubular steel drill collar section. Each of the first and second transmitting antenna means is arranged around the drill collar section and they are axially spaced from each other. The transmitting circuit means includes circuit means contained within the drill collar section and coupled to the first and second transmitting antenna means to supply, on an alternating basis, the oscillating drive signal such that one and then the other of the transmitting antenna means radiates an electromagnetic wave signal that propagates through the formation. Each receiving antenna means is arranged around the drill collar section at an axially spaced position between the first and second transmitting antenna means and each includes antenna circuit means in which an induced alternating current is produced while the electromagnetic wave signal propagates through the formation. Each receiving antenna means includes an antenna conductor and a capacitor interconnected to define a single-turn, tuned antenna. The capacitor cooperates with the antenna conductor to provide an extremely low impedance in the frequency region embracing the frequency of the oscillating drive signal. The means in each antenna receiving means for producing a pick-up signal includes a transformer having a core coupled to the antenna conductor. The sampled-data signal processing means includes means for producing a phase-representing signal representing the phase difference between the pick-up signals produced by the first and second receiving antenna means. Further, the sampled-data signal processing means includes sequentially operating processing means for recording at least one phase-representing signal and thereafter processing such stored phase-representing signal together with a subsequently produced phase-representing signal to produce the signal that is a function of the formation resistivity.

The invention has significant advantages in that it provides for stable, high-sensitivity reception of propagating electromagnetic waves. Tuning each receiving antenna means enables an increase in antenna sensitivity by a factor in excess of ten. An important benefit of the high-sensitivity of the receiving antenna means is that long spacings can be used between each tuning antenna means and the receiving antenna means closest to it. Such long spacings are advantageous in reducing adverse effects on measurement accuracy that are generally caused by borehole and invaded zone variations. Further, tuning each receiving antenna means significantly reduces its impedance, which in turn reduces adverse electrostatic effects. As a result, electrostatic shielding arrangements are optional, and if provided, need not involve complex assemblies for insulating electrostatic shielding elements from the metal drill collar in a MWD system.

The foregoing and other features and advantages of the invention are described in detail below and recited in the appended claims.

BRIEF DESCRIPTION OF THE DRAWINGS

FIG. 4 is a schematic cross-sectional view taken along line 4-4' of FIG. 2B, illustrating a receiver conductor encapsulated in insulating material surrounding a portion of the sub;

FIG. 5 is a schematic cross-sectional view taken along line 5-5' of FIG. 4, illustrating a junction box containing a tuning capacitor and other components used to implement a receiving antenna means in the preferred embodiment;

FIG. 7 is a schematic and block diagram of a portion of control circuitry incorporated in the preferred embodiment to provide switching control such that, on an alternating basis, one and then another transmitting antenna means transmits an electromagnetic wave signal to propagate into and through the formation surrounding the borehole;

FIG. 8 is a block diagram of the drive circuitry that is replicated for the first and second transmitting antenna means as illustrated in FIG. 6;

FIG. 9 is a block diagram of a phase-locked local oscillator signal generator in the receiving circuitry illustrated in FIG. 6;

DETAILED DESCRIPTION

Figure 1:
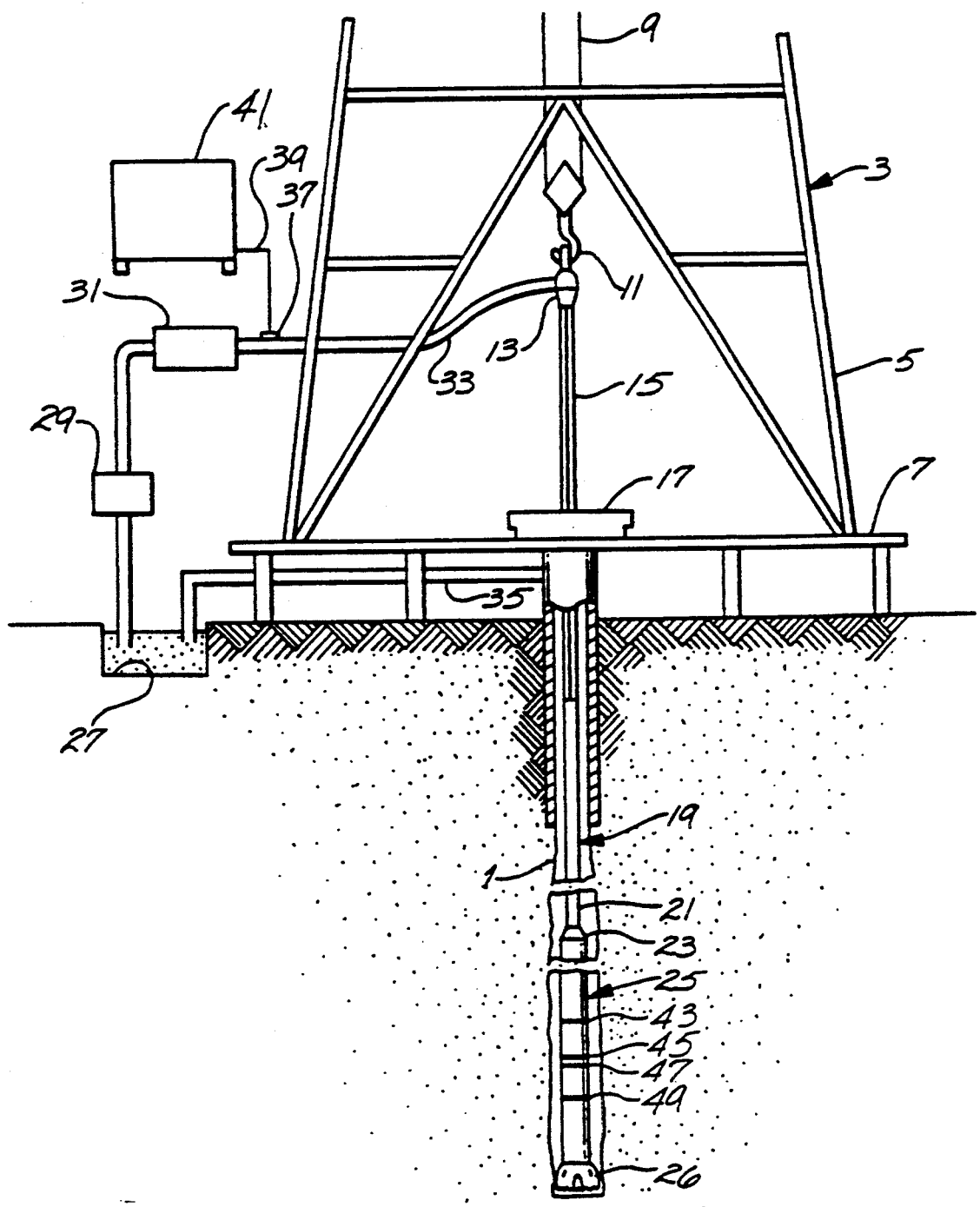
FIG. 1 shows an overall system for simultaneously drilling and logging a well, in which a logging collar includes a formation-resistivity measuring system according to this invention.

By way of introduction, certain principles underlying important features of this invention are indicated by the following generally applicable analysis.

First, consider four transmitter-to-receiver signals:
(Transmitter 1 [X1] to Receiver 1 [R1]): $A_{11} e^{i\phi 11}$
(Transmitter 1 [X1] to Receiver 2 [R2]): $A_{12} e^{i\phi 12}$
(Transmitter 2 [X2] to Receiver 1 [R1]): $A_{21} e^{i\phi 21}$
(Transmitter 2 [X2] to Receiver 2 [R2]): $A_{22} e^{i\phi 22}$
The measured amplitudes are made up of:

$$A_{mn} = X_m R_n a_{tmn} \quad \text{(Eq. 1.1)}$$

where $X_m$ = transmitter output variation
$R_n$ = receiver sensitivity variation
$a_{tmn}$ = true amplitude (transmitter M to receiver N);
and the measured phases are made up of:

$$\phi_{mn} = \phi_{Xm} + \phi_{Rn} + \phi_{tmn} \quad \text{(Eq. 1.2)}$$

where $\phi Xm$ = transmitter phase (output) variation
$\phi_{Rn}$ = receiver phase variation
$\phi_{tmn}$ = true phase (transmitter M to receiver N)
The foregoing general equations correspond to the following more specific equations:

$$A_{11} = X_1 R_1 a_{t11}$$

$$A_{12} = X_1 R_2 a_{t12}$$

$$A_{21} = X_2 R_1 a_{t21}$$

$$A_{22} = X_2 R_2 a_{t22}$$

$$\phi_{11} = \phi_{X1} + \phi_{R1} + \phi_{t11}$$

$$\phi_{12} = \phi_{X1} + \phi_{R2} + \phi_{t12}$$

$$\phi_{21} = \phi_{X2} + \phi_{R1} + \phi_{t21}$$

$$\phi_{22} = \phi_{X2} + \phi_{R2} + \phi_{t22}$$

Taking ratios of the various transmitter-to-receiver signals produces the following:
For Transmitter 1:

$$\frac{A_{12} e^{i\phi 12}}{A_{11} e^{i\phi 11}} = \frac{A_{12}}{A_{11}} e^{i(\phi 12 - \phi 11)}$$

and for Transmitter 2:

$$\frac{A_{21} e^{i\phi 21}}{A_{22} e^{i\phi 22}} = \frac{A_{21}}{A_{22}} e^{i(\phi 21 - \phi 22)}$$

Multiplying these and taking the square root gives:

$$\sqrt{\frac{A_{12}}{A_{11}} e^{i(\phi 12 - \phi 11)} * \frac{A_{21}}{A_{22}} e^{i(\phi 21 - \phi 22)}}$$

$$\sqrt{\frac{A_{12} * A_{21}}{A_{11} * A_{22}}} e^{i1/2(\phi 12 + \phi 21 - \phi 11 - \phi 22)} \quad \text{(Eq. 1.3)}$$

Straightforward algebraic manipulation of Eqs. 1.1 through 1.3 yields:

$$\frac{a_{t12} * a_{t21}}{a_{t11} * a_{t22}} e^{i1/2(\phi t12 + \phi t21 - \phi t11 - \phi t22)}$$

because all the system variables drop out of the measurement

Therefore, by using two transmitters and two receivers, systematic variable can be removed from both the attenuation (amplitude) and from the phase velocity (phase difference) terms.

Within the context of the preferred embodiment of this invention, in which a sampled-data processing means produces a signal as a function of formation resistivity based on phase-representing signals, the following analysis demonstrates certain matters relevant to the stability feature.

Consider two consecutive samples, i.e., Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes the second receiving coil (R2), and later passes the first receiving coil (R1), and induces each receiver coil to produce a signal.

Let $\phi MR2A$ represent the measured phase of the signal produced by receiver coil R2 during Sample A; let $\phi MR1A$ represent the measured phase of the signal produced by receiver coil R1 during Sample A; let $\phi MR1B$ represent the measured phase of the signal produced by receiver coil R1 during Sample B; and let $\phi MR2B$ represent the measured phase of the signal produced by receiver coil R2 during Sample B.

The $\phi MR2A$ signal depends on the phase of the wave at the location of R2, and in general, has an error component attributable to various phase shifts including those introduced by the tuned receiver coil, cabling from the receiver coil to the receiver, and the receiver itself. Let $\phi TR2A$ represent the true phase of the wave at the location of R2 during sample A, and let $\phi R2E$ represent the error component so introduced.

$$\phi MR2A = \phi TR2A + \phi R2E \quad \text{Eq. 2.1}$$

Similarly, the $\phi MR1A$ signal depends on the phase of the wave at the location of R1, and in general, has its own error component. Let $\phi TR1A$ represent the true phase of the wave at the location of R1 during Sample A, and let $\phi R1E$ represent the error component so introduced.

$$\phi MR1A = \phi TR1A + \phi R1E \quad \text{Eq. 2.2}$$

During Sample A, the $\phi MR1A$ signal and the $\phi MR2A$ are simultaneously processed to produce a DeltaA signal that represents the difference in phase between these two signals (i.e., $\phi MR1A - \phi MR2A$).

$$\text{DeltaA} = (\phi TR2A - \phi TR1A) + (\phi R2E - \phi R1E) \quad \text{Eq. 2.3}$$

The component of the DeltaA signal representing the true phase difference ($\phi TR2A - \phi TR1A$) is a function of the resistivity of the formation in the region between the two receiver coils. Let f(rho) represent this component.

$$\text{DeltaA} = f(rho) + (\phi R2E - \phi R1E) \quad \text{Eq. 2.4}$$

Similarly, during Sample B, the $\phi MR2B$ signal and the $\phi MR1B$ are simultaneously processed to produce a DeltaB signal that represents the difference in phase between these two signals (i.e., $\phi MR2B - \phi MR1B$).

$$\phi MR1B = \phi TR1B + \phi R1E \qquad \text{Eq. 2.5}$$

$$\phi MR2B = \phi TR2B + \phi R2E \qquad \text{Eq. 2.6}$$

$$\text{DeltaB} = (\phi TR1B - \phi TR2B) + (\phi R1E - \phi R2E) \qquad \text{Eq. 2.7}$$

The component of the DeltaB signal representing the true phase difference ($\phi TR1B - \phi TR2B$) is a function of the resistivity of the formation in the region between the two receiver coils; i.e., it equals f(rho).

$$\text{DeltaB} = f(rho) + (\phi R1E - \phi R2E) \qquad \text{Eq. 2.8}$$

The DeltaA signal is recorded so that it can be retrieved and processed with the DeltaB signal.

By adding Equations 2.7 and 2.8, it follows that:

$$\text{DeltaA} + \text{DeltaB} = 2 * f(rho) + \phi R2E - \phi R1E - \phi R2E + \phi R1E$$

and $$f(rho) = \tfrac{1}{2} * (\text{DeltaA} + \text{DeltaB}) \qquad \text{Eq. 2.9}$$

In other words, a computed signal representing the sum of the consecutive samples is a function of formation resistivity, and error components such as $\phi R1E$ and $\phi R2E$ do not introduce errors into this computed signal.

With reference to FIG. 1, there will now be described an overall simultaneous drilling and logging system that incorporates an electromagnetic wave propagation (EWP) resistivity measurement system according to this invention.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar or sub 25 immediately below the intermediate sub. A drill bit 26 is carried by the lower end of sub 25. To provide dual systems for measuring formation resistivity, the intermediate sub can be made in accord with the teachings of the above-mentioned U.S. patent application Ser. No. 025,937, filed Mar. 16, 1987, and entitled "WELL LOGGING SYSTEM EMPLOYING FOCUSED CURRENT IN MEASURING RESISTIVITY WHILE DRILLING"; the inventors being J. Meisner et al., the disclosure of which is incorporated by reference herein.

Drilling fluid (or mud, as it is commonly called) is circulated from a mud pit 27 through a mud pump 29, past a desurger 31, through a mud supply line 33, and into swivel 13. The drilling mud flows down through the kelly joint and an axial tubular conduit in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

The overall system of FIG. 1 uses mud pulse telemetry techniques to communicate data from downhole to the surface while the drilling operation takes place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More (More '536 patent), mud pulse telemetry techniques provide for communicating data to the surface about numerous downhole conditions sensed by well logging transducers or measurement systems that ordinarily are located on and within the drill collar nearest the drill bit. Sub 25 is preferably nearest the drill bit, as shown in FIG. 1. The mud pulses that define the data propagated to the surface are produced by equipment within the intermediate sub. Such equipment suitably comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention.

A measurement system embodying this invention includes electronics contained in electronics housings contained within the axial tubular conduit of sub 25, and contains elements arranged in recesses or necked-down portions of the tubular steel housing of sub 25. Some of these elements on sub 25 are indicated, in FIG. 1, and include four antenna-insulating sleeves 43, 45, 47, and 49, each of which surrounds a longitudinally-extending, necked-down portion of sub 25.

Figure 2:
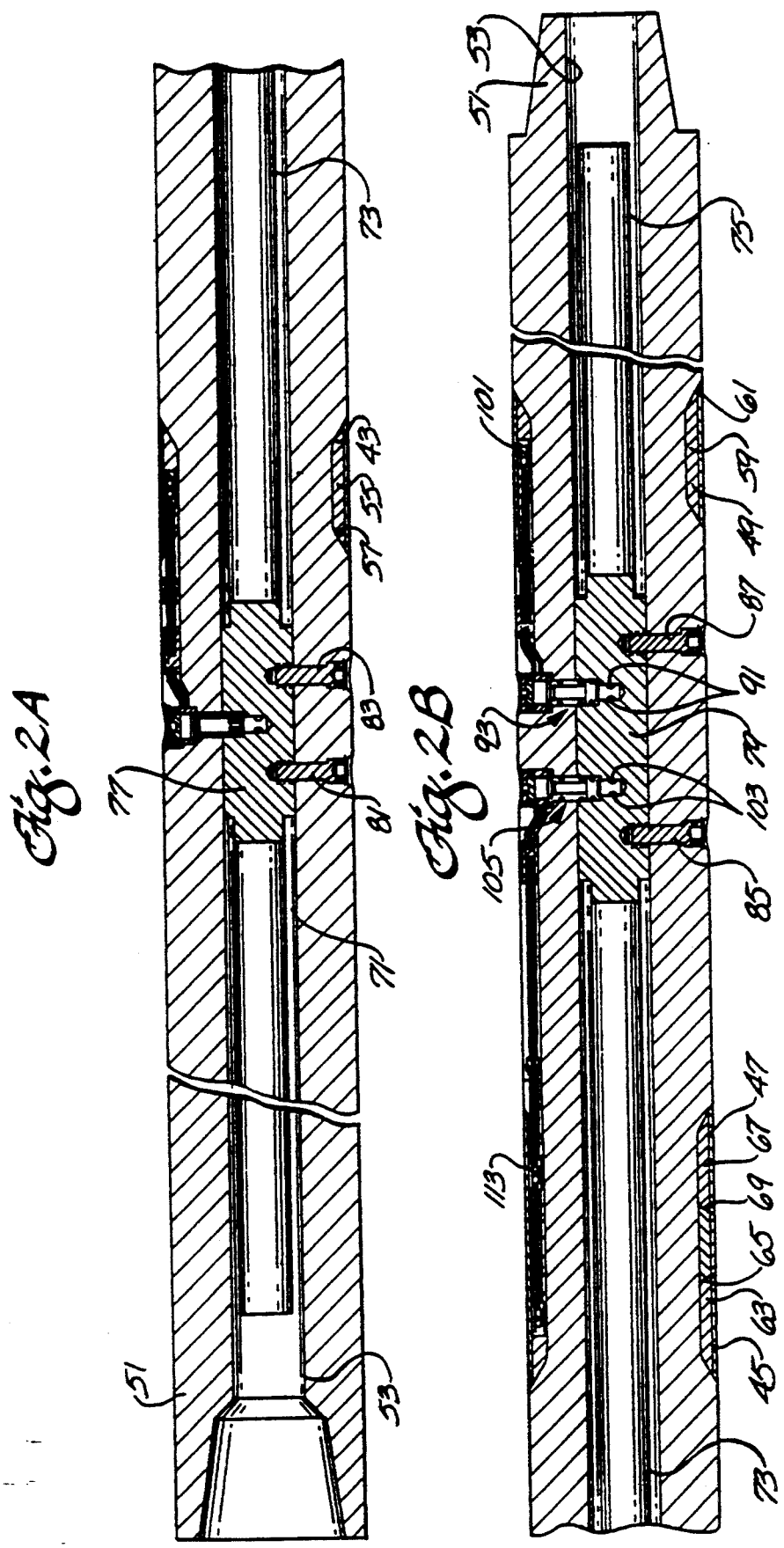
FIGS. 2A and 2B which are schematic, side elevation views, partly in cross-section, of a top and bottom portion, respectively, of a drill collar section or sub in accord with the preferred embodiment of the invention.

As shown schematically in the cross-sectional views of FIGS. 2A and 2B, sub 25 comprises a tubular steel housing 51 which has an axial bore 53 to provide a passage for downflowing drilling mud.

A conductor 55 is part of a first transmitting antenna assembly which is encapsulated in antenna-insulating sleeve 43 that surrounds a circumferential recess 57 in tubular steel housing 51. A conductor 59 is part of a second transmitting antenna assembly which is encapsulated in antenna-insulating sleeve 49 that surrounds a circumferential recess 61 in tubular steel housing 51. A conductor 63 is part of a first receiving antenna assembly which is encapsulated in antenna-insulating sleeve 45 that surrounds a circumferential recess 65 in tubular steel housing 51. A conductor 67 is part of a second receiving antenna assembly which is encapsulated in antenna-insulating sleeve 47 that surrounds a circumferential recess 69 in tubular steel housing 51.

The ring-shaped portion of the collar that separates recess 65 from recess 69 provides for de-coupling between the first and the second receiving antenna assemblies. An alternative arrangement involves a single recess for both the first and the second receiving antenna assemblies. In the alternative arrangement, the receiving antenna assemblies can be spaced closer together.

Suitably, each antenna-insulating sleeve is made of multiple layers including an outer layer of nitrile rubber, a material which is sufficiently durable to protect the encapsulated antenna coil from wear despite the adverse conditions involved in a drilling operation, and provides adequate electrical insulation despite the hydrostatic pressures involved in the drilling operation. A suitable way to make each sleeve involves several steps including wrapping around the recess a durable fiberglass of the type that is used in replaceable insulating sleeves for MWD subs. Then, portions of the fiberglass wrapping are cut away to provide circumferential and longitudinal grooves for conductors of the antenna assembly and to provide a recess for a junction box. After insertion of the components of the antenna assembly, the nitrile rubber is applied.

Suitably, the axial spacing from conductor 55 of the first transmitting antenna assembly to conductor 63 of the first receiving antenna assembly is 28 inches, from conductor 63 to conductor 67 of the second receiving antenna assembly is 10 inches, and from conductor 67 to conductor 59 of the second transmitting antenna assembly is 28 inches. In the above-mentioned alternative arrangement in which both receiving antenna assemblies are in a single recess, the spacings suitably are 30 inches, 6 inches, and 30 inches.

Within axial bore 53, there are arranged three pressure-sealed electronics housings 71, 73, and 75, together with supporting blocks 77 and 79. Each supporting block has opposite side surfaces that each has a convex shape to abut portions of the interior cylindrical surface of sub 25. Each remaining side surface of each supporting block is generally flat, and is spaced from the interior cylindrical surface of sub 25 to provide a passageway for downflowing drilling mud. Supporting blocks 77 and 79 are fixed in place by sealed anchor bolts 81, 83, 85, and 87.

Figure 3:
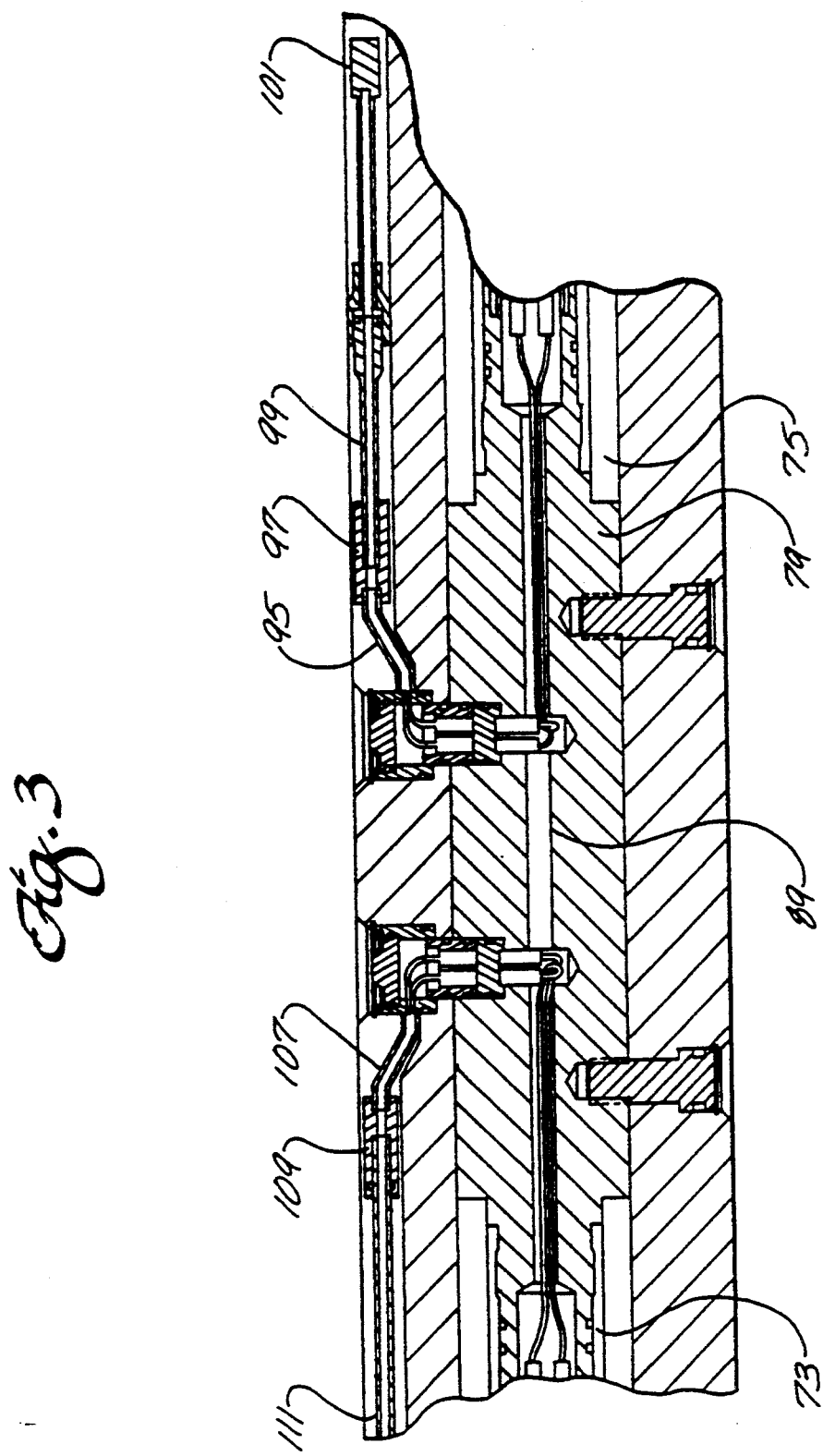
FIG. 3 is an enlarged schematic, cross-sectional side elevation view of a portion of the sub illustrated in FIG. 2.

As shown in the enlarged view of FIG. 3, supporting block 79 has an axial bore 89 that serves as section of a conduit assembly for conductors that extend from circuitry in electronics housings 73 and 75. Axial bore 89 communicates with openings 91 (FIG. 2B) in a pressure-sealed, generally radially-extending port connector assembly 93 that serves as a section of the conduit assembly for conductors that interconnect circuitry within electronics housing 75 and the second transmitting antenna assembly. Other sections of this conduit assembly are a port tube 95, a tubing length adjuster 97, and tubing 99 that terminates in a junction box 101.

Axial bore 89 also communicates with openings 103 (FIG. 2B) in another pressure-sealed, generally radially-extending port connector assembly 105 that serves as a section of the conduit assembly for conductors that interconnect circuitry in electronics housing 73 and the first and second receiving antenna assemblies. Other sections of this conduit assembly are a port tube 107, a tubing length adjuster 109, and tubing 111 that terminates in a junction box 113.

With reference to FIGS. 4 and 5, there will now be described the construction of the second receiving antenna assembly. Conductor 67 and a tuning capacitor 115 are interconnected to define a single-turn, tuned receiving antenna. Suitably, the capacitance value of capacitor 115 is 0.012 microfarads. In combination with a conductor forming a one-turn loop of 6 ½ inch diameter, tuning capactor 115 makes the receiving antenna highly sensitive in the frequency region embracing 2 Mhz. This is so because the capacitive reactance is equal (but opposite in phase from) the inductive reactance and therefore the loop impedance is minimum (and essentially resistive). In operation, an alternating current is induced in the loop circuit defined by conductor 67 and capacitor 115 while an electromagnetic wave propagates through the formation. The magnitude of this alternating current depends on, among other things, the impedance of the loop circuit. At 2 Mhz, the impedance of the loop circuit is about 0.5 ohms. Within junction box 113, conductor 67 extends through the aperture of a ferrite ring 117 that defines the core of a high efficiency transformer. Conductor 67 defines the primary of the transformer. A toroidal winding 119 defines the secondary of the transformer and provides a receiver pick-up signal that is coupled to receiver circuitry via a coax cable 121. The first receiving antenna assembly has the same construction as the second receiving antenna assembly, and a coax cable 123 extends from it through junction box 113 as shown in FIG. 5 to couple the pick-up signal from the first receiving antenna assembly to receiver circuitry.

With reference to the simplified functional block diagram of FIG. 6, there will now be described general features of the overall organization of signal transmitting, signal receiving, and signal processing circuitry incorporated in the preferred embodiment.

As stated above, a MWD system embodying this invention preferably includes a turbine-driven generator that converts mechanical power supplied by downflowing drilling mud to electrical power. In a conventional and well known manner, a DC regulator responds to the generator and supplies DC power which, although regulated to some extent, is subject to a fairly substantial variation in voltage. This DC power is applied to a DC-to-AC converter 161. A quartz crystal 163 that resonates at 20 Khz is coupled to circuitry 161 so that the AC power-supply voltage it supplies is at or very close to 20 Khz, and is in the form of a square wave. As explained further below, this AC power-supply voltage defines a frequency reference, and is accordingly sometimes referred to as a frequency reference (FR) signal.

In a conventional and well known manner, the FR signal is coupled via transformers and connectors so that 20 Khz AC power-supply voltage is available to provide power to circuitry located in each electronics housing.

The circuitry located in electronics housing 71 (FIG. 2A) includes drive circuitry 165 that is coupled to supply an oscillating drive signal to the first transmitting antenna means 167. The circuitry located in electronics housing 73 (FIG. 2B) includes receiving circuitry 169, power supply circuitry 171, and data processing and timing and control circuitry 173. Receiving circuitry 169 is coupled to the first and second receiving antenna means 175 and 177. The circuitry located in electronics housing 75 (FIG. 2B) includes drive circuitry 179 that is coupled to supply an oscillating drive signal to the second transmitting antenna means 181.

Circuitry 173 includes a microprocessor and associated circuitry, which together perform numerous functions, including a basic timing function for sequencing the alternating operation of the first and second transmitting antenna means.

The microprocessor provides a two-bit wide transmitter-select signal comprising an A bit and a B bit that are coded as follows: if the A bit and the B bit have the same binary value (whether both "1" or both "0") then this represents a command to turn transmitters off; if the A bit is "1" and the B bit is "0", then this represents a command to turn transmitter 1 on and turn transmitter 2 off; and, if the A bit is "0" and the B bit is "1", then this represents a command to turn transmitter 1 off and turn transmitter 2 on. In the preferred embodiment, a "1" binary value is represented by +5 volts, whereas a "0" binary value is represented by 0 volts (ground).

In the preferred embodiment, the digitally-coded transmitter select signal is converted to an analog signal by circuitry within electronics housing 73 and coupled to circuitry and electronics housings 71 and 75 in a highly advantageous way. In this regard, reference is made to FIG. 7. A weighting circuit generally indicated at 185 in FIG. 7 comprises a resistor 187, a resistor 189, a pair of protection diodes 191 and 193, a resistor 195, and a capacitor 197, all of which are connected to a common node point 199 that is connected to the center tap of a primary winding of a transformer 201. The resistance values of resistors 185, 187, and 195 are selected such that the potential at node point 199 constitutes an analog control signal.

Suitable resistance values are 1K ohm for resistor 187, 2K ohm for resistor 189, and 10K ohm for resistor 195. If each of the A bit and the B bit signals is +5 volts, then the potential at node point 199 is +4.69 volts. If each of the A bit and the B bit signals is 0 volts, then the potential at node point 199 is 0 volts. If the A bit signal is +5 volts and the B bit signal is 0 volts, then the potential at node point 199 is at or approximately +3.13 volts. If the A bit signal is 0 volts and the B bit signal is +5 volts, then the potential at node point 199 is at or approximately +1.56 volts. The opposite ends of the primary winding of transformer 201 are connected to conductors 205 and 207 that define an AC power bus within electronics housing 73. A pair of conductors 211 and 213 in electronics housing 71 are connected to conductors 205 and 207. Conductors 211 and 213 are connected to opposite ends of a center tapped primary winding of a transformer 215 within electronics housing 71. The center tap of this primary winding within electronics housing 71 operates at the same DC potential as the DC potential impressed on the center tap of the primary winding of transformer 201 within electronics housing 73.

A conductor 217 is connected between the center tap of the primary winding of transformer 215 to one end of a resistor 219 that forms part of an on/off control circuit arrangement generally indicated at 221.

Circuit arrangement 221 produces a transmitter on/off control signal that is high to define a command to turn transmitter 1 on, and is low to define a command to turn transmitter 1 off. If the potential on conductor 217 is greater than +1 volt and less than +2 volts, then the transmitter on/off control signal is high; otherwise, it is low.

The circuitry within circuit arrangement 221 includes a resistor divider network comprising resistors 223, 225 and 227, and a pair of comparators, 229 and 231. Comparators 229 and 231 have open collector outputs that are wire-ANDed together.

The resistance values of resistors 223, 225, and 227 are selected so that the potential at the inverting input of comparator 231 is +1 volt, and the potential at the non-inverting input of comparator 229 is +2 volts. A capacitor 223 is provided to cooperate with resistor 219 in defining a low pass noise-rejecting filter.

As to circuitry for controlling transmitter 2, there is provided a circuit arrangement generally indicated at 235 that is located within electronics housing 75 and that has essentially the same configuration circuit arrangement 221. The resistor divider network for circuit arrangement 235 applies a potential of +2 volts to the inverting input of a comparator 237, and a potential of +4 volts to the non-inverting input of a comparator 239.

Reference is now made to FIG. 8. The overall function of the circuitry shown in block diagram form in. FIG. 8 is to provide an oscillating transmitter-drive signal that is coupled to a transmitting antenna coil. The oscillating transmitter-drive signal is a generally square-wave modulated sine wave, and is produced by a closed loop arrangement such that the frequency of the sine wave is an exact multiple of the FR signal; the center frequency of the sine wave is 2 Mhz. A buffer circuit 241 responds to the FR signal to provide a square-wave input signal to a circuit that defines a phase comparator 243. A suitable integrated circuit for implementing the function of phase comparator 243 is manufactured and sold by Motorola and other companies under the designation MC 14568.

This phase comparator circuit produces an analog phase error signal that is applied to a conventional voltage controlled oscillator (VCO) circuit 245 that includes an 8 Mhz crystal that establishes the center frequency of oscillation of VCO 245. A conventional Schmitt trigger circuit 247 responds to the output of VCO 245 to apply a square-wave signal to a divide-by-four circuit 249. The output signal of circuit 249 is a square wave having a 2 Mhz center frequency; it is fed back to phase comparator circuit 249 to define a phase lock loop, and it is also applied to one input of a NAND gate 251. The other input of NAND gate 251 responds to a respective one of the transmitter on/off control signals described above with reference to FIG. 7. Conventional power driver circuitry 253 responds to the output of NAND gate 251 to produce the generally square-wave modulated 2 Mhz sine-wave signal that is coupled to a transmitting antenna coil.

Reference is now made to FIG. 9. The overall function of the circuitry shown in block diagram form in FIG. 9 is to produce a phase-locked sine-wave signal with a center frequency of 1.995 Mhz, that is used as a local oscillator signal by receiving circuitry located in electronics housing 73. The FR signal is applied to a phase comparator circuit 255 that suitably is implemented by the same integrated circuit used to implement phase comparator 243 as described above with reference to FIG. 8. The output of phase comparator circuit 255 is applied to a conventional voltage controlled oscillator (VCO) circuit 257 that includes a 7.982 Mhz crystal that establishes the center frequency of oscillation of VCO 257. The output of VCO 257 is applied to a conventional Schmitt trigger circuit 259 that drives a divide-by-four counter 261. The output of divide-by-four counter 261 is a square wave having a center frequency of 1.995 Mhz. This signal is applied to a counter circuit 263 which forms part of a feedback path of a phase lock loop generally indicated at 265. Suitably, counter 263 is implemented by an integrated circuit manufactured and sold by Motorola and other companies under the designation MC 14569. A buffer circuit 267 responds to the 1.995 Mhz square wave and drives a conventional band pass filter circuit 269 which produces a 1.995 Mhz sine wave that is used as a local oscillator signal.

Figure 10:
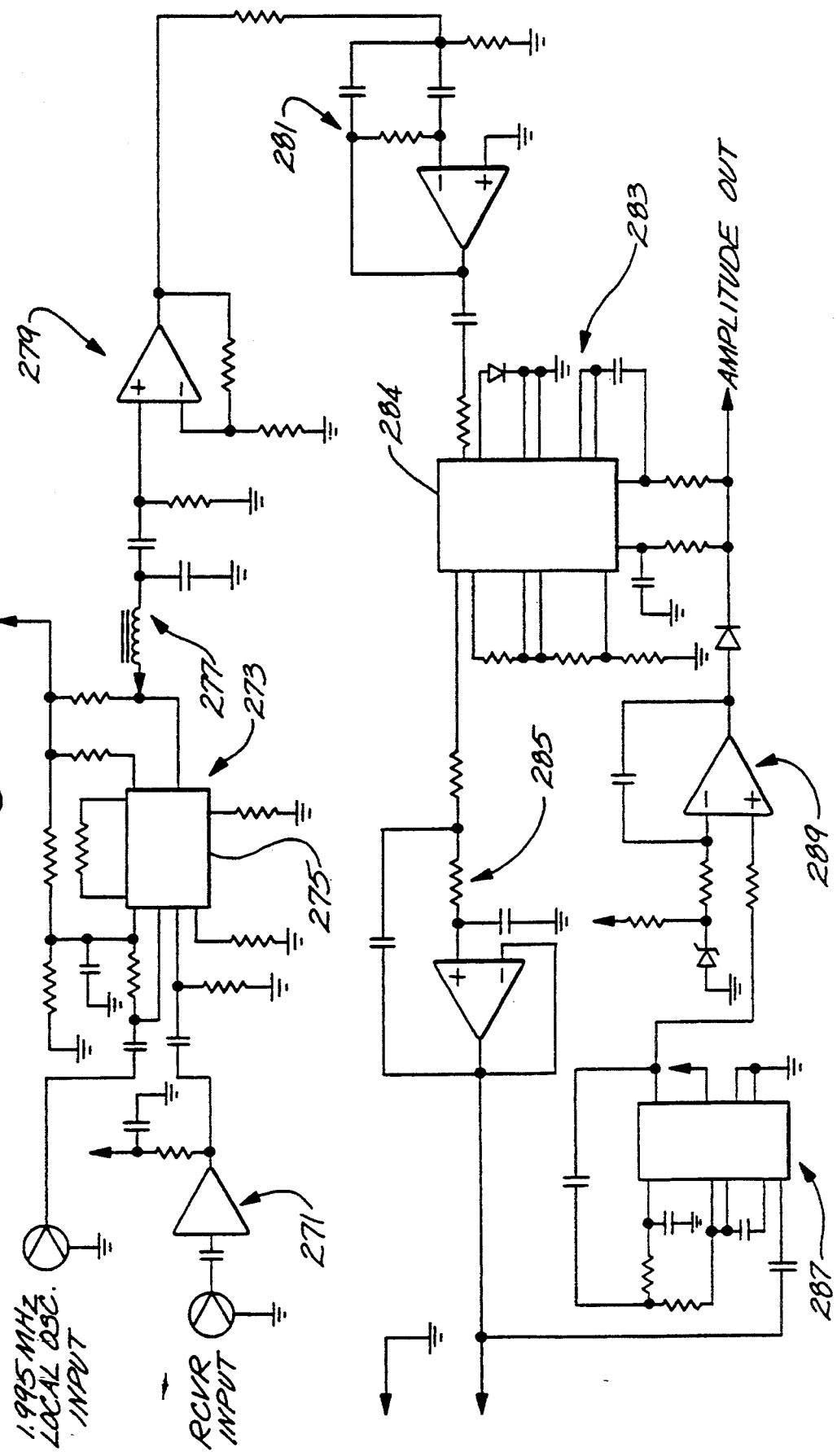
FIG. 10 is a block and schematic diagram of signal processing circuitry that is replicated for the first and second receiving antenna means in the preferred embodiment.

Reference is now made to FIG. 10. The overall function of the circuitry depicted in block diagram and schematic form in FIG. 10 is to respond to the local oscillator signal and one of the two receiver coil output signals to produce a receiver phase output signal and a receiver amplitude output signal. A conventional pre-amp circuit generally indicated at 271 responds to the receiver pick-up signal and its output is applied to a mixer circuit arrangement generally indicated at 273. Mixer circuit arrangement 273 includes an integrated circuit 275 that suitably is implemented by an integrated circuit manufactured and sold by Motorola and other companies under the designation MC 1596.

Because the frequency of the pick-up signal and the local oscillator signals are phase-locked to a common frequency reference and differ by 5 Khz, the intermediate frequency (IF) produced by mixer circuit arrangement 273 is at 5 Khz. A band pass tuning circuit arrangement generally indicated at 277 passes the 5 Khz IF signal to an amplifier circuit arrangement generally indicated at 279. An active band pass filter circuit arrangement generally indicated at 281 provides further band pass filtering and provides a signal to an analog divider circuit arrangement generally indicated at 283 that includes an integrated circuit analog computational unit 284. A suitable integrated circuit analog computational unit is sold by Analog Devices under the designation AD538. Divider 283 is part of an AGC loop arrangement which includes an active low pass filter generally indicated at 285 and RMS-To-DC converter arrangement generally indicated at 287 and an integrating active filter generally indicated at 289 which produces a feedback signal to multiplier circuit arrangement 283.

Figure 11:
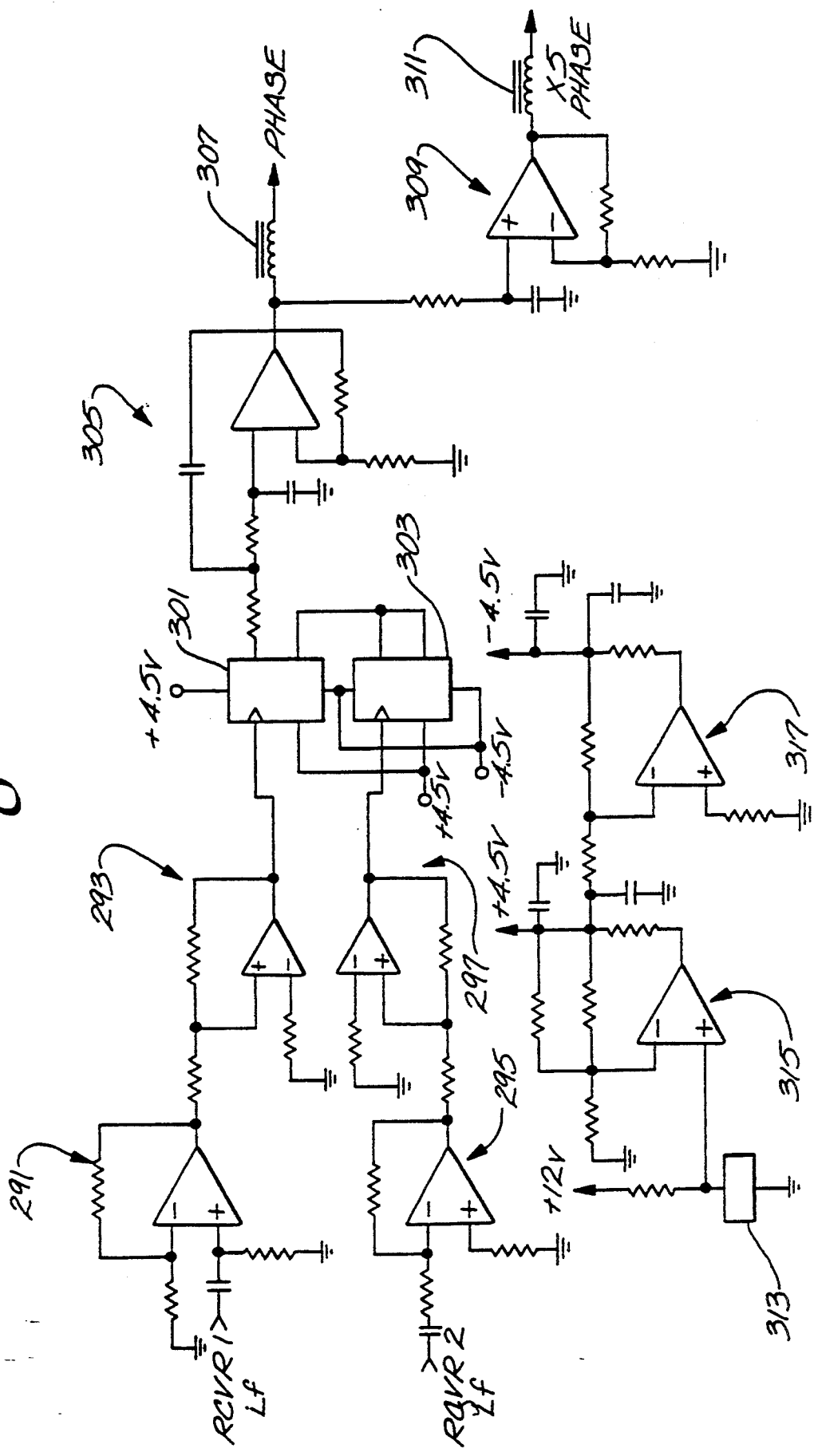
FIG. 11 is a block and schematic diagram of signal processing circuitry that responds to the replicated circuitry of FIG. 10 to produce multi-scale signals, each representing a phase difference.

With reference to FIG. 11, there will now be described circuitry performing the overall function of responding to the first and second receiver IF signals to produce two phase-representing analog signals having different scale factors.

An amplifier circuit generally indicated at 291 and a Schmitt trigger circuit generally indicated at 293 are connected in tandem to convert the receiver 1 IF signal into a square wave that is in phase with the receiver 1 IF signal. An amplifier circuit generally indicated at 295 and a Schmitt trigger generally indicated at 297 are connected in tandem to convert the receiver 2 IF signal into a square wave signal that is 180 degrees out of phase with respect to the receiver 2 IF signal.

A pair of D-type flip flops 301 and 303 are interconnected in a conventional manner to define a phase detector that produces a pulse width modulated (PWM) signal. An integrating circuit generally indicated at 305 cooperates with a filter choke 307 to convert a PWM signal to an analog phase-representing signal designated as "PHASE" in FIG. 11. The PHASE signal has a scale factor such that a peak voltage of +5 volts represents a 100° phase difference.

A non-inverting amplifier generally indicated at 309 and a filter choke 311 cooperate to produce another phase representing analog control signal designated in FIG. 11 as "x5 PHASE". The x5 PHASE signal has a scale factor such that a peak voltage of +5 volts represents a 20° phase difference.

The positive and -negative supply voltages of +4.5 volts and −4.5 volts for flip flops 301 and 303 are derived from the +12 volt and −12 volt supplies. In this regard, an integrated circuit voltage reference 313 establishes a reference potential that is stable with temperature. Suitably integrated circuit 313 is an LM135 sold by National Semiconductor and others. The temperature-stable voltage reference is applied to a non-inverting amplifier generally indicated at 315 which produces the +4.5 volt supply voltage. An inverting amplifier generally indicated at 319 produces the −4.5 volt supply voltage.

Flip flop 301 is triggered into its set state on each positive edge in the square wave signal produced by Schmitt trigger 293. While flip flop 301 is in its set state, the PWM signal is at a potential of about +4.5 volts. Flip flop 303 is triggered into its set state when each positive edge in the square wave signal is produced by Schmitt trigger 297. The Q output of flip flop 303 is connected to its reset (R) input and Go the reset (R) input of flip flop 301. Thus, upon being triggered into its set state, flip flop 303 immediately resets itself and also resets flip flop 301. While flip flop 301 is in its reset state, the PWM signal is at a potential of about −4.5 volts.

In circumstances in which the receiver 1 IF signal and the receiver 2 IF signal are exactly in phase with each other, the PWM signal is a square wave with an amplitude of ±4.5 volts. Thus, in such circumstances, the phase signal is produced by integrating the square wave to 0 volts.

In circumstances in which the receiver 1 IF signal leads the receiver 2 IF signal, the PWM signal has a wave form involving a positive pulse and a negative pulse, with the negative pulse being wider than the positive pulse. In circumstances in which the receiver 1 IF signal lags the receiver 2 IF signal, the PWM signal has a wave form involving a positive pulse which is wider than the negative pulse. The integrated signal in either case has a magnitude that is proportional to the difference in phase between the two IF signals, and a sign that indicates which one leads the other.

Figure 6:
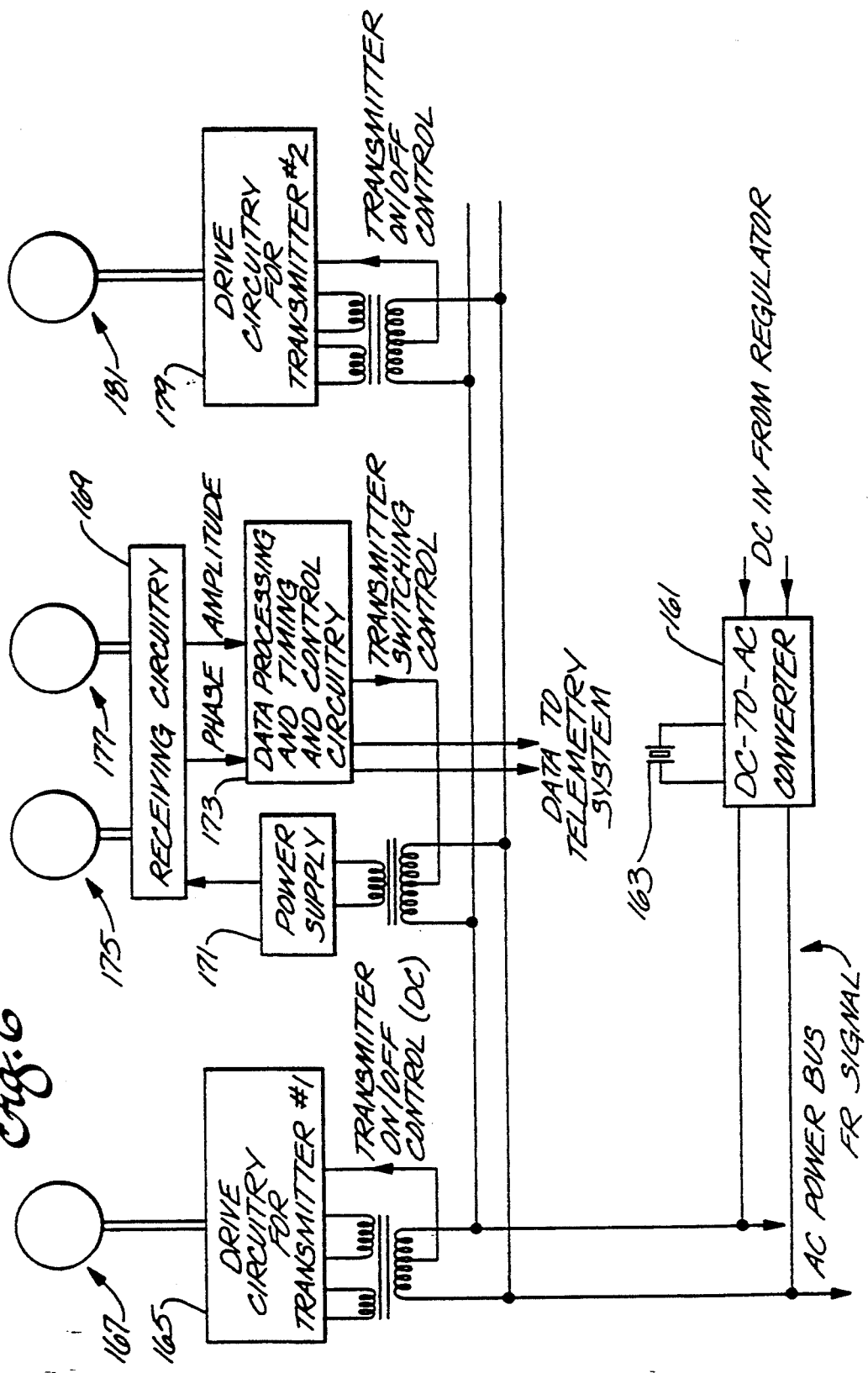
FIG. 6 is a simplified functional block diagram illustrating the overall organization of signal transmitting, receiving, and processing circuitry incorporated in the preferred embodiment of the invention.

As indicated in FIG. 6, data processing circuitry 173 is responsive to the phase signals produced by receiving circuitry 169. Data processing circuitry 173 includes conventional memory means for storing sampled data provided in the sequential operation involved in alternately transmitting from the first transmitting circuit means and the second transmitting antenna means. As explained at the outset of this detailed description, the difference between the phases that are alternately measured constitutes data from which formation resistivity can be inferred without errors attributable to certain system tolerances or variations.

Suitably, data processing circuitry 173 computes values of formation resistivity and communicates the computed values to the surface via mud pulse telemetry techniques.

Figure 12:
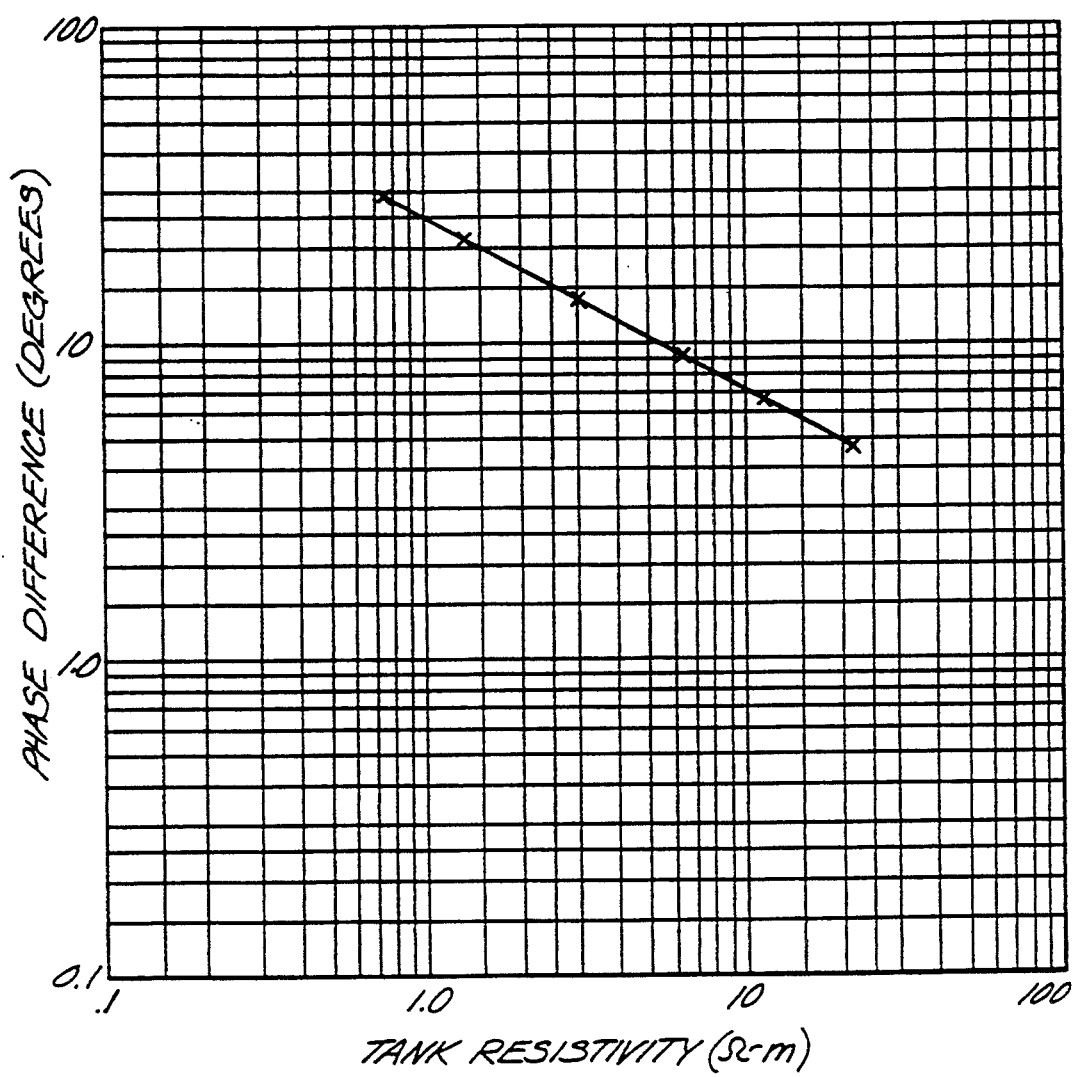
FIG. 12 is a plot of experimental data showing the relationship between phase difference and resistivity for a representative embodiment of the invention.

As to determining the functional relationship between formation resistivity and the integrated signal, suitable techniques involve collecting experimental data and applying curve-fitting techniques. FIG. 12 shows experimental data collected for a sub having an 8″ diameter, a X1 to R1 spacing of 30″, a X2 to R2 spacing of 30″, and a R1 to R2 spacing of 6″. The data were collected using a 10′ diameter test tank and a 15″ diameter an borehole.

For the data plotted in FIG. 12, a satisfactory curve-fit has been obtained with the use of a second-order (quadratic) polynomial fitted to a log-log representation of the data. This may be written as:

x = log(phi)
y = ax² + bx + c
R = exp(y)

where phi is the phase angle in degrees, R is resistivity in ohm-meters, and a, b, and c are constants. The following table shows values for the plotted points and resistivity values obtained from these equations using a = −0.111651, b = 1.27811, and c = 5.22370:

| Rplotted | Phi | Rcalc |
|----------|--------|-------|
| 20.3 | 4.619 | 20.22 |
| 10.35 | 6.816 | 10.58 |
| 6.5 | 9.111 | 6.39 |
| 3.06 | 13.886 | 2.97 |
| 1.35 | 20.439 | 1.42 |
| 0.76 | 28.291 | 0.74 |

The above-described specific embodiment of this invention is presently preferred, and is subject to numerous modifications within the scope of this invention, as defined in the following claims.

We claim:

1. A logging apparatus for use in a wellbore for determining resistivity of a formation when coupled to a wellbore tubular and suspended in said wellbore, comprising:
   a housing, including means for coupling said housing to said wellbore tubular;
   first and second transmitters, spaced apart a selected distance on said housing, each transmitter being individually and selectively operable for producing an electromagnetic interrogating signal at a selected interrogation frequency for passage through portions of said formation which surround said wellbore;
   first and second receivers, spaced apart a selected distance on said housing in a selected position relative to said first and second transmitters, each receiver being tuned to receive electromagnetic signals at said interrogation frequency to the exclusion of other frequencies;
   wherein a portion of said formation which is disposed about said wellbore between said first and second receivers has a resistivity value which can be derived from at least one of (a) amplitude attenuation of said electromagnetic interrogating signal directed between said first and second receivers as determined from measurements of said electromagnetic interrogating signal taken by said first and second receivers, and (b) phase shift of said electromagnetic interrogating signal between said first and second receivers as determined from measurements of said electromagnetic interrogating signal taken by said first and second receivers;
   said logging apparatus includes a plurality of system error components which are manifest as (a) amplitude-effecting error components including transmitter amplitude output variation and receiver sensitivity variation, and (b) phase-effecting error components including transmitter phase variation and receiver phase variation; and
   a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation said system error components.

2. A logging apparatus according to claim 1, wherein said controller member obtains elimination of both amplitude-effecting error components and phase-effecting error components.

3. A logging apparatus according to claim 1, wherein said controller member eliminates by cancellation said system error components by combining measurements from said first and second receivers in both said first and second sample modes of operation.

4. A logging apparatus according to claim 3, wherein said measurements are combined by adding measurements from said first and second receivers from both said first and second sample modes of operation.

5. A logging apparatus according to claim 4, wherein substantially error-free measurement of the effect of said formation on the phase of said interrogating signal is obtained by said controller member by combining consecutive samples of phase of said first and second receivers in said first and second sample modes of operation.

6. A logging apparatus according to claim 1, further comprising:
   a first drive circuit which is responsive to said controller member for energizing said first transmitter;
   a second drive circuit which is responsive to said controller member for energizing said second transmitter;
   wherein said first drive circuit is dedicated to said first transmitter and is located proximate said first transmitter and remote from said first and second receivers;
   wherein said second drive circuit is dedicated to said second transmitter and is located proximate said second transmitter and remote from said first and second receivers.

7. A logging apparatus according to claim 6, wherein said control member controls and selectively actuates said first and second drive circuits and said first and second receivers with control signals including at least one reference signal, all of said control signals having a frequency substantially different from said interrogation frequency of said electromagnetic interrogating signal.

8. A logging apparatus according to claim 1, wherein said first and second receivers simultaneously provide a low impedance for magnetic fields and a high impedance for electrical fields to minimize susceptibility of said first and second receivers to electrostatic noise and thus minimize need for electrostatic shielding on antennae members of said first and second receivers.

9. A logging apparatus for use in a wellbore for determining resistivity of a formation when coupled to a wellbore tubular and suspended in said wellbore, comprising:
   a housing, including means for coupling said housing to said wellbore tubular;
   first and second transmitters, spaced apart a selected distance on said housing, each transmitter being individually and selectively operable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has a resistivity value which can be derived from at least one of (a) amplitude attenuation of said electromagnetic interrogating signal directed between said first and second receivers as determined from measurements of said electromagnetic interrogating signal taken by said first and second receivers and (b) phase shift of said electromagnetic interrogating signal directed between said first and second receivers as determined from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation error components;

a first drive circuit which is responsive to said controller member for energizing said first transmitter;

a second drive circuit which is responsive to said controller member for energizing said second transmitter;

wherein said first drive circuit is dedicated to said first transmitter and is located proximate said first transmitter and remote from said first and second receivers;

wherein said second drive circuit is dedicated to said second transmitter and is located proximate said second transmitter and remote from said first and second receivers.

10. A logging apparatus for use in a wellbore for determining resistivity of a formation when coupled to a wellbore tubular and suspended in said wellbore, comprising:

a housing, including means for coupling said housing to said wellbore tubular;

first and second transmitters, spaced apart a selected distance on said housing, each transmitter being individually and selectively operable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has a resistivity value which can be derived from at least one of (a) amplitude attenuation of said electromagnetic interrogating signal directed between said first and second receivers as determined from measurements of said electromagnetic interrogating signal taken by said first and second receivers and (b) phase shift of said electromagnetic interrogating signal directed between said first and second receivers as determined from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation said system error components;

a first drive circuit which is responsive to said controller member for energizing said first transmitter;

a second drive circuit which is responsive to said controller member for energizing said second transmitter;

wherein said first drive circuit is dedicated to said first transmitter and is located proximate said first transmitter and remote from said first and second receivers;

wherein said second drive circuit is dedicated to said second transmitter and is located proximate said second transmitter and remote from said first and second receivers; and wherein a plurality of conductors extend through said housing for coupling said controller member, said first and second transmitters, said first and second drive circuits, and said first and second receivers, which carry at least one reference signal which at least in-part synchronizes operation of said controller member, said first and second transmitters, said first and second drive circuits, and said first and second receivers, said at least one reference signal having a frequency which is substantially different from said interrogation frequency of said electromagnetic interrogating signal.

11. A logging apparatus according to claim 10, wherein said first and second receivers simultaneously provide a low impedance for magnetic fields and a high impedance for electrical fields to minimize susceptibility of said first and second receivers to undesirable electrostatic noise and thus minimize need for electrostatic shielding on antennae members of said first and second receivers.

12. A logging apparatus for use in a wellbore to measure an electrical parameter of a formation surrounding a wellbore, the logging apparatus comprising:

a housing;

first and second transmitting antenna means, each arranged around said housing means and spaced from each other;

transmitter circuit means for alternately supplying an oscillating drive signal to said first and second transmitting antenna means, said oscillating electrical drive signal causing said first and second transmitting antenna means to radiate an electromagnetic wave signal that propagates through said formation;

first and second series resonant receiving antenna means for producing first and second pick-up signals, the resonant frequency of said first and second receiving antenna means being in a region embracing the frequency of said oscillating drive signal;

said logging apparatus includes a plurality of system error components which are manifest as (a) amplitude-effecting error components including transmitter amplitude output variation and receiver amplitude sensitivity variation, and (b) phase-effecting error components including transmitter phase variation and receiver phase variation; and sampled-data signal processing means responsive to the pick-up signals for producing a signal that is a function of said electrical parameter of said formation and which eliminates said system error components by combining selected pickup signals.

13. A measurement-while-drilling apparatus for measuring an electrical parameter of a formation surrounding a borehole, the measurement-while-drilling apparatus comprising:

a tubular steel drill collar section;

first and second transmitting antenna means, each arranged around said tubular steel drill collar section and axially spaced from each other;

transmitter circuit means for alternately supplying an oscillating drive signal to said first and second transmitting antenna means, said oscillating drive signal causing said first and second transmitting antenna means to radiate an electromagnetic wave signal that propagates through said formation;

first and second series resonant receiving antenna means for producing first and second pick-up signals, each of said first and second series resonant receiving antenna means being arranged around said tubular steel drill collar section at an axially spaced position between said first and second transmitting antenna means and each including antenna circuit means in which an induced alternating current is produced while said electromagnetic wave signal propagates through said formation, the resonant frequency of said antenna circuit means being in a region embracing the frequency of said oscillating drive signal, and means responsive to said induced alternating current for producing a respective one of said pick-up signals;

said measurement-while-drilling apparatus includes a plurality of system error components which are manifest as (a) amplitude-effecting error components including transmitter amplitude output variation and receiver sensitivity variation, and (b) phase-effecting error components including transmitter phase variation and receiver phase variation; and sampled-data signals processing means responsive to said pick-up signals for combining pickup signals to eliminate said system error components for producing a signal that is representative of said electrical parameter of said formation but which is substantially unaffected by said system error components.

14. A method for measuring an electrical parameter of the formation surrounding a borehole, which comprises the method steps of:

positioning in said borehole first and second series resonant single turn receiving antennae that are each tuned with a series connected capacitor to increase reception sensitivity at a predetermined frequency, each of said first and second series resonant single turn receiving antennae being coupled by a receiver cable to a receiver circuit;

generating an oscillating electrical drive signal at said predetermined frequency;

alternately coupling said oscillating electrical drive signal to one and then another of a pair of transmitters to cause an electromagnetic wave signal to propagate through said formation in first one direction and then another direction so that said electromagnetic wave signal induces said first and second receiving antenna to develop a first pair and then a second pair of pick-up signals, said first and second pick-up signals including error components attributable to at least one of: (1) transmitter amplitude output variation, (2) receiver sensitivity variation, (3) transmitter phase variation, and (4) receiver phase variation;

processing said first pair of pick-up signals to produce a first sampled signal which includes said error components, and recording said first sampled signal;

processing said second pair of pick-up signals to produce a second sampled signal which includes said error components; and processing the recorded first sampled signal and the second sampled signal by combining sampled signals to produce a signal that is a function of said electrical parameter of said formation but which is unaffected by said error components.

15. A logging apparatus for use in a wellbore, comprising:

a housing;

first and second transmitters, spaced apart a selected distance on said housing, each transmitter being individually and selectively operable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has a formation characteristic which is detectable from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation error components;

a first drive circuit which is responsive to said controller member for energizing said first transmitter;

a second drive circuit which is responsive to said controller member for energizing said second transmitter;

wherein said first drive circuit is dedicated to said first transmitter and is located proximate said first transmitter and remote from said first and second receivers;

wherein said second drive circuit is dedicated to said second transmitter and is located proximate said second transmitter and remote from said first and second receivers.

16. A logging apparatus for use in a wellbore for determining a selected formation characteristic of a formation when coupled to a wellbore tubular and suspended in said wellbore, comprising:

a housing, including means for coupling said housing to said wellbore tubular;

first and second transmitters, spaced apart a selected distance on said housing, each transmitter being individually and selectively operable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has a formation characteristic which is detectable from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation error components;

a first drive circuit which is responsive to said controller member for energizing said first transmitter;

a second drive circuit which is responsive to said controller member for energizing said second transmitter;

wherein said first drive circuit is dedicated to said first transmitter and is located proximate said first transmitter and remote from said first and second receivers;

wherein said second drive circuit is dedicated to said second transmitter and is located proximate said second transmitter and remote from said first and second receivers.

17. A logging apparatus for use in a wellbore, comprising:

a housing;

first and second transmitters, spaced apart a selected distance on said housing, each transmitter being individually and selectively actuable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has a formation characteristic which can be determined from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation error components;

a first drive circuit which is responsive to said controller member for energizing said first transmitter;

a second drive circuit which is responsive to said controller member for energizing said second transmitter; and wherein a plurality of conductors extend through said housing for coupling said controller member, said first and second transmitters, said first and second driver circuits, and said first and second receivers, which carry at least one reference signal which at least in-part synchronizes operation of said controller member, said first and second transmitters, said first and second drive circuits, and said first and second receivers, said at least one reference signal having a frequency which is substantially different from said interrogation frequency of said electromagnetic interrogating signal.

18. A logging apparatus for use in a wellbore for determining an electrical parameter of a formation when coupled to a wellbore tubular and suspended in said wellbore, comprising:

a housing, including means for coupling said housing to said wellbore tubular;

first and second transmitters, spaced apart a selected distance on said housing, each transmitter being individually and selectively operable for producing an electromagnetic interrogating signal at a selected interrogation frequency for passage through portions of said formation which surround said wellbore;

first and second receivers, spaced apart a selected distance on said housing in a selected position relative to said first and second transmitters, each receiver being tuned to receive electromagnetic signals at said interrogation frequency to the exclusion of other frequencies;

wherein a portion of said formation which is disposed about said wellbore between said first and second receivers has an electrical parameter value which can be derived from at least one of (a) amplitude attenuation of said electromagnetic interrogating signal directed between said first and second receivers as determined from measurements of said electromagnetic interrogating signal taken by said first and second receivers and (b) phase shift of said electromagnetic interrogating signal directed between said first and second receivers as determined from measurements of said electromagnetic interrogating signal taken by said first and second receivers;

a controller member for alternately energizing said first and second transmitters in (a) a first sample mode of operation with said electromagnetic interrogating signal passing through said formation in a direction from said first receiver to said second receiver and (b) a second sample mode of operation with said electromagnetic interrogating signal passing through said formation in a direction from said second receiver to said first receiver, for selectively obtaining measurements of said electromagnetic interrogating signal with said first and second receivers, and for combining said measurements to eliminate by cancellation error components;

a first drive circuit which is responsive to said controller member for energizing said first transmitter;

a second drive circuit which is responsive to said controller member for energizing said second transmitter;

wherein a plurality of conductors extend through said housing for coupling said controller member, said first and second transmitters, said first and second drive circuits, and said first and second receivers, which carry at least one reference signal which at least in-part synchronizes operation of said controller member, said first and second transmitters, said first and second drive circuits, and said first and second receivers, said at least one reference signal having a frequency which is substantially different from said interrogation frequency of said electromagnetic interrogating signal;

wherein said first and second receivers simultaneously provide a low impedance for magnetic fields and a high impedance for electrical fields to minimize susceptibility of said first and second receivers to undesirable electrostatic noise and thus minimize need for electrostatic shielding on said first and second receivers.

19. A logging apparatus for use in a wellbore which is surrounded by a formation, comprising:

a housing;

a plurality of transmitters located at selected axial positions along said housing;

at least one driver for selectively energizing selected ones of said plurality of transmitters and causing electromagnetic radiation to propagate through portions of said formation;

a plurality of receivers located at selected axial positions along said housing for detecting at least one characteristic of said electromagnetic radiation;

processor means for determining at least one formation property from a plurality of readings, taken with said plurality of receivers, of said at least one characteristic of said electromagnetic radiation;

wherein radial penetration of said electromagnetic radiation depends at least in-part upon a propagation path length as defined between selected transmitters and receivers; and wherein said plurality of transmitters and said plurality of receivers include at least one formation interrogation subsystem including first and second receivers spaced apart a selected distance on said housing in a position intermediate first and second transmitters, with said first and second receivers and said first and second transmitters being substantially symmetrically positioned.

20. A logging apparatus according to claim 19, wherein:

during a first sample mode of operation said at least one driver energizes said first transmitter to cause electromagnetic radiation to propagate toward said first and second receivers; and during a second sample mode of operation said at least one driver energizes said second transmitter to cause electromagnetic radiation to propagate toward said first and second receivers.

21. A logging apparatus according to claim 20:

wherein said logging apparatus includes a plurality of system error components which are manifest as amplitude-effecting error components and phase-effecting error components; and wherein said processor means combines a plurality of readings, taken with said plurality of receivers during said first and second sample modes of operation, to eliminate by cancellation said amplitude-effecting error components and said phase-effecting error components.

* * * * *